(12) United States Patent
Wu et al.

(10) Patent No.: US 12,725,890 B2
(45) Date of Patent: Sep. 1, 2026

(54) BATTERY CELL, BATTERY, AND POWER CONSUMING APPARATUS

(71) Applicant: CONTEMPORARY AMPEREX TECHNOLOGY CO., LIMITED, Ningde (CN)

(72) Inventors: Kai Wu, Ningde (CN); Biao Huang, Ningde (CN); Wenfa Lin, Ningde (CN); Zetao Ye, Ningde (CN); Weijie Luo, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/363,619

(22) Filed: Oct. 20, 2025

(65) Prior Publication Data

US 2026/0045658 A1 Feb. 12, 2026

Related U.S. Application Data

(63) Continuation of application No. PCT/CN2024/088061, filed on Apr. 16, 2024.

(30) Foreign Application Priority Data

Sep. 18, 2023 (CN) ........................ 202311204427.9

(51) Int. Cl.
*H01M 50/553* (2021.01)
*H01M 50/184* (2021.01)
(Continued)

(52) U.S. Cl.
CPC ....... *H01M 50/553* (2021.01); *H01M 50/184* (2021.01); *H01M 50/188* (2021.01);
(Continued)

(58) Field of Classification Search
CPC ............. H01M 50/553; H01M 50/184; H01M 50/188; H01M 50/567
(Continued)

(56) References Cited

U.S. PATENT DOCUMENTS

2010/0173178 A1* 7/2010 Kim .................... H01M 50/597 429/1
2011/0268999 A1* 11/2011 Nagai ................. H01M 50/176 429/53
2016/0141731 A1* 5/2016 Tanigawa ........... H01R 13/6616 324/437

FOREIGN PATENT DOCUMENTS

CN 203492792 U 3/2014
CN 111490190 A 8/2020
(Continued)

OTHER PUBLICATIONS

International Search Report in the international application No. PCT/CN2024/088061, mailed on Jul. 14, 2024, 6 pages with English translation.
(Continued)

*Primary Examiner* — Osei K Amponsah
*Assistant Examiner* — Kevin Nguyen
(74) *Attorney, Agent, or Firm* — K&L Gates LLP

(57) ABSTRACT

A battery cell, a battery, and a power-consuming apparatus are provided. The battery cell includes a housing, terminal-post bodies, and a terminal-post cover plate. The housing defines an accommodating cavity and includes mounting holes through which the terminal-post bodies extend. Each terminal-post body has an abutting portion positioned outside the housing, and a sink groove at an end opposite the cavity. The sink groove is located closer to the central axis of the mounting hole than the abutting portion. The terminal-post cover plate covers the terminal-post bodies and includes connection portions that engage the terminal-post bodies at
(Continued)

the sink grooves. Each connection portion is connected to the part of the terminal-post body located at the sink groove on the cavity side and is spaced from a groove wall near the abutting portion. This structure helps improve assembly reliability and electrical performance.

20 Claims, 8 Drawing Sheets

(51) Int. Cl.

| | |
|---|---|
| ***H01M 50/188*** | (2021.01) |
| ***H01M 50/198*** | (2021.01) |
| ***H01M 50/55*** | (2021.01) |
| ***H01M 50/567*** | (2021.01) |

(52) U.S. Cl.
CPC ......... *H01M 50/198* (2021.01); *H01M 50/55* (2021.01); *H01M 50/567* (2021.01); *H01M 2220/20* (2013.01)

(58) Field of Classification Search
USPC .......................................................... 429/163
See application file for complete search history.

(56) References Cited

FOREIGN PATENT DOCUMENTS

| | | | |
|---|---|---|---|
| CN | 215266481 | U | 12/2021 |
| CN | 216720089 | U | 6/2022 |
| CN | 217562687 | U | 10/2022 |
| CN | 218602700 | U | 3/2023 |
| CN | 218769994 | U | 3/2023 |
| CN | 219067004 | U | 5/2023 |
| JP | 2000058035 | A | 2/2000 |
| JP | 2023529378 | A | 7/2023 |
| WO | 2012/011470 | A1 | 1/2012 |
| WO | 2023/082689 | A1 | 5/2023 |

OTHER PUBLICATIONS

ISA Written Opinion in the international application No. PCT/CN2024/088061, mailed on Jul. 14, 2024, 9 pages with English translation.

Notice of Allowance (with English Machine Translation), mailed Oct. 29, 2025, for corresponding Chinese Patent Application Serial No. 202311204427.9.

Office Action (with English Machine Translation), mailed May 19, 2026, for corresponding Japanese Patent Application Serial No. 2025-538756.

* cited by examiner

102
A
1
A
3
2
4

BATTERY CELL, BATTERY, AND POWER CONSUMING APPARATUS

CROSS-REFERENCE TO RELATED APPLICATIONS

The present application is a continuation of International Application No. PCT/CN2024/088061, filed on Apr. 16, 2024, which claims priority to Chinese Patent Application No. 202311204427.9, filed with the China National Intellectual Property Administration on Sep. 18, 2023 and entitled "BATTERY CELL, BATTERY, AND POWER CONSUMING APPARATUS", which is incorporated herein by reference in its entirety.

TECHNICAL FIELD

The present application relates to the field of battery technologies, and in particular, to a battery cell, a battery, and a power consuming apparatus.

BACKGROUND

In recent years, new energy vehicles have been rapidly developed. In the field of electric vehicles, a power battery plays an irreplaceable and important role as a power source of an electric vehicle. The power battery includes a plurality of battery cells. However, reliability of the battery cells needs to be improved.

SUMMARY

Embodiments of the present application provide a battery cell, a battery, and a power consuming apparatus, and can improve reliability of a battery cell.

According to a first aspect, an embodiment of the present application provides a battery cell, including a housing, terminal-post bodies, and a terminal-post cover plate. The housing is provided with mounting holes. An accommodating cavity is defined in the housing. The terminal-post bodies penetrate through the mounting holes. The terminal-post body includes an abutting portion abutting outside the housing. A sink groove is provided at an end portion of the terminal-post body that is away from the accommodating cavity. The sink groove is disposed closer to a central axis of the mounting holes than the abutting portion. The terminal-post cover plate covers the terminal-post bodies, and includes connection portions connected to the terminal-post bodies. Each of the connection portions is disposed at the sink groove, is connected to a part that is of one of the terminal-post bodies and that is located at the sink groove and close to a side of the accommodating cavity, and is separated from a groove wall of the sink groove close to the abutting portion.

In the foregoing technical solution, each of the connection portions is connected to the part that is of one of the terminal-post bodies and that is located at the sink groove and close to the side of the accommodating cavity, and the connection portion is separated from the groove wall of the sink groove close to the abutting portion, to form separation space. In this way, not only a connection requirement between the terminal-post cover plate and the terminal-post bodies can be satisfied, but also a force generated when the terminal-post cover plate is connected to the terminal-post body can be blocked by the separation space, to reduce transmission of the force to the abutting portion. This helps improve a problem that the abutting portion warps due to the force, improve reliability of abutting between the abutting portion and the housing, and further improve connection reliability and sealing tightness between the terminal-post bodies and the housing. Therefore, reliability of the battery cell can be improved. In addition, the problem that the abutting portion warps can be improved, so that it is beneficial to improve a problem that assembly and connection of a busbar component are affected because the abutting portion warps, and improve smoothness and reliability of connection between the busbar component and the terminal-post cover plate. In addition, the connection portion of the terminal-post cover plate that is connected to the terminal-post body is separated from the groove wall of the sink groove close to the abutting portion, so that a requirement on an assembly gap between the terminal-post cover plate and the terminal-post body can be reduced, a requirement on processing precision of the terminal-post cover plate can be reduced, and compatibility of the terminal-post body can be increased.

In some embodiments, the connection portions are welded to the part that is of one of the terminal-post bodies and that is located at the sink groove and close to the side of the accommodating cavity.

In the foregoing technical solution, the connection portions are connected to the terminal-post bodies through welding, so that connection reliability between the terminal-post bodies and the terminal-post cover plate can be improved, and another component for connection can be omitted, thereby simplifying a structure and reducing costs. In addition, because the connection portions are welded to the part that is of one of the terminal-post bodies and that is located at the sink groove and close to the side of the accommodating cavity, and after a molten pool is formed in each of the connection portions and solidified, the connection portion is separated from the groove wall of the sink groove close to the abutting portion, a shrinking stress generated due to the solidification of the molten pool can be blocked, and is hardly or rarely conducted to the abutting portion. Therefore, the problem that the abutting portion warps can be improved.

In some embodiments, the terminal-post body includes a penetrating portion penetrating through one of the mounting holes, and at least a part of one of the connection portions is disposed on the penetrating portion and connected to the penetrating portion.

In the foregoing technical solution, at least a part of one of the connection portions is disposed on the penetrating portion and connected to the penetrating portion. Because the penetrating portion penetrates through one of the mounting holes, in an axial direction of the mounting holes, the penetrating portion may have a sufficient size to be connected to the connection portion. In this way, it is beneficial to improve the connection reliability between the terminal-post bodies and the terminal-post cover plate. For example, when the connection portion is welded to the penetrating portion, a depth of fusion is sufficient, so that welding reliability between the connection portion and the penetrating portion is improved.

In some embodiments, the penetrating portion is annular, and a radial width by which each of the connection portions covers one of the terminal-post bodies is less than a radial wall thickness of the penetrating portion.

In the foregoing technical solution, when the penetrating portion is annular, the radial width by which each of the connection portions covers one of the terminal-post bodies is set to be less than the radial wall thickness of the penetrating portion, so that the radial wall thickness of the penetrating portion is sufficient to support the connection portion and the penetrating portion is connected to the connection portion, thereby improving the connection reliability between the terminal-post bodies and the terminal-post cover plate. For example, when the connection portion is welded to the penetrating portion, the connection portion may be welded to only the penetrating portion, and a depth of fusion is sufficient at the connection portion, so that the welding reliability between the connection portion and the penetrating portion is improved.

In some embodiments, the abutting portion is connected to the penetrating portion and extends relative to the penetrating portion in a direction away from the central axis of the mounting holes, and the abutting portion protrudes from the penetrating portion in a direction away from the accommodating cavity, to define the sink groove between a surface of the abutting portion that is close to the central axis of the mounting holes and a surface of the penetrating portion that is away from the accommodating cavity.

In the foregoing technical solution, the sink groove is jointly defined by the abutting portion and the penetrating portion, so that a structure of the terminal-post bodies can be simplified, and the sink groove can be easily designed and processed. In addition, in comparison with a solution of "hollowing a part of the surface of the penetrating portion away from the accommodating cavity to form the sink groove", a radial outer edge of the sink groove may extend in the direction away from the central axis of the mounting holes, to facilitate fitting with the connection portion of the terminal-post cover plate, thereby facilitating satisfying a requirement of disposing a side groove wall of the sink groove spaced away with the connection portion.

In some embodiments, a depth of the sink groove in an axial direction of the mounting holes ranges from one third to two thirds of a thickness of the abutting portion in the axial direction of the mounting holes.

In the foregoing technical solution, the depth of the sink groove is not excessively large, to ensure a sufficient wall thickness at a position at which the abutting portion is connected to the penetrating portion, so as to improve structural strength of a weak position of the terminal-post body. In addition, the depth of the sink groove is not excessively small, so that the connection portion can be accommodated in the sink groove to a large extent, thereby reducing a volume by which the connection portion protrudes out of the sink groove, and improving interference caused by the protrusion of the connection portion on the assembly and connection of the busbar component.

In some embodiments, the penetrating portion is annular, and a side of the sink groove close to the central axis of the mounting holes is open, to communicate with an inner annular region of the penetrating portion.

In the foregoing technical solution, when the penetrating portion is annular, the side of the sink groove close to the central axis of the mounting holes is open to communicate with the inner annular region of the penetrating portion, so as to further simplify a design and processing of the sink groove. In comparison with a solution in which "when the penetrating portion is annular, the side of the sink groove close to the central axis of the mounting holes is closed", a radial inner edge of the sink groove may extend in a direction approaching the central axis of the mounting holes, to facilitate fitting with the terminal-post cover plate, thereby facilitating simplifying a structural design of the terminal-post cover plate.

In some embodiments, the abutting portion includes a first section and a second section that are sequentially disposed in a direction away from the penetrating portion. When a surface perpendicular to the axial direction of the mounting holes is used as a projection surface and the axial direction of the mounting holes is used as a projection direction, a projection of the first section on the projection surface is located inside a projection of one of the mounting holes on the projection surface, and a projection of the second section on the projection surface is located outside the projection of the mounting hole on the projection surface.

In the foregoing technical solution, the second section may abut against the housing, to satisfy a requirement that the terminal-post body abuts against and fits the housing. In addition, the first section that is not configured to abut against the housing further exists between the second section and the sink groove, and the first section is used to define the side groove wall of the sink groove. Therefore, a problem that the second section warps due to connection between the connection portion and the penetrating portion can be improved, thereby facilitating improving reliability of fitting between the abutting portion and the housing.

In some embodiments, the abutting portion is formed on the terminal-post body through flange riveting.

In the foregoing technical solution, processing of the terminal-post bodies is convenient, and the sink groove can be easily obtained. In addition, when the abutting portion is connected to the penetrating portion, it is beneficial to improve connection reliability between the abutting portion and the penetrating portion, and improve assembly reliability between the terminal-post body and the housing.

In some embodiments, a distance between each of the connection portions and the groove wall of the sink groove close to the abutting portion gradually increases in a direction away from the accommodating cavity.

In the foregoing technical solution, assembly of the connection portion to the sink groove is facilitated, and a position with a large interval is correspondingly welded to a position that is of the molten pool and that is greatly solidified, shrunken, and deformed, to facilitate further improving, by setting the large interval, the problem that the abutting portion warps. In addition, a position with a small interval is beneficial to improve structural strength of a position that has a small wall thickness and that is formed by providing a groove in the terminal-post body.

In some embodiments, a cross-sectional area of the sink groove gradually increases in the direction away from the accommodating cavity.

In the foregoing technical solution, the sink groove is in a flared form, thereby facilitating assembly between the connection portion of the terminal-post cover plate and the sink groove, and improving assembly efficiency between the terminal-post cover plate and the terminal-post body. In addition, when the sink groove is in the flared form, it is beneficial to implement a design in which the distance between each of the connection portions and the groove wall of the sink groove close to the abutting portion gradually increases in the direction away from the accommodating cavity.

In some embodiments, the terminal-post cover plate includes a cover plate body, each of the connection portions is located at an edge of the cover plate body, and a surface of a side of the cover plate body that is away from the accommodating cavity protrudes from a surface of a side of the connection portion that is away from the accommodating cavity.

In the foregoing technical solution, an interference impact caused to the assembly of the busbar component because the connection portion protrudes from the cover plate body can be avoided, thereby improving convenience of the assembly of the busbar component and the reliability of the connection between the busbar component and the terminal-post cover plate.

In some embodiments, the thickness of the abutting portion in the axial direction of the mounting holes is greater than a thickness of each of the connection portions in the axial direction of the mounting holes.

In the foregoing technical solution, because the thickness of the abutting portion is larger than the thickness of the connection portion, deformation of the abutting portion is reduced, thereby further improving the problem that the abutting portion warps due to the connection between the connection portion and the terminal-post body.

In some embodiments, the thickness of each of the connection portions in the axial direction of the mounting holes ranges from three quarters to five quarters of the depth of the sink groove in the axial direction of the mounting holes.

In the foregoing technical solution, the thickness H2 of each of the connection portions in the axial direction of the mounting holes is close to the depth H3 of the sink groove in the axial direction of the mounting holes, and the connection portion may be roughly accommodated in the sink groove, to reduce an interference impact on the assembly of the busbar component caused by the connection portion protruding from an outer surface of the abutting portion.

In some embodiments, a surface of each of the connection portions that is away from the accommodating cavity obliquely extends toward a direction approaching the accommodating cavity and in the direction away from the central axis of the mounting holes.

In the foregoing technical solution, because a thickness of the connection portion at a position close to the cover plate body is large, and a thickness of the connection portion at a position close to the side groove wall of the sink groove is small, processing and forming of the connection portion of the terminal-post cover plate is facilitated, a material waste is reduced, and costs are reduced. In addition, because the thickness of the connection portion at the position close to the cover plate body is large, and the thickness of the connection portion at the position close to the side groove wall of the sink groove is small, reliability of connecting the terminal-post cover plate and the terminal-post body by the formed connection portion can be improved. In addition, because a wall thickness of the terminal-post cover plate at the connection portion is reduced, it is beneficial to avoid the interference impact on the assembly of the busbar component caused by the connection between the connection portion and the terminal-post body. In addition, when the connection portion is welded and connected to the terminal-post body through laser, the connection portion is set to the oblique form, so that an angle can be formed between a laser reflection path and a laser incidence path, thereby improving a problem that the laser reflects and damages a laser transmitter, and protecting the laser transmitter.

In some embodiments, the terminal-post body includes the penetrating portion penetrating through one of the mounting holes, and the abutting portion is connected to the penetrating portion and extends relative to the penetrating portion in the direction away from the central axis of the mounting holes. The battery cell further includes insulating and sealing structures configured to enable the housing and the terminal-post bodies to fit in an insulating and sealing manner. Each of the insulating and sealing structures includes a part disposed between the penetrating portion and the housing and a part disposed between the abutting portion and the housing.

In the foregoing technical solution, the terminal-post body is in indirect contact with the housing by disposing the insulating and sealing structure, so that a requirement that the connection between the housing and the terminal-post body is insulted and sealed is satisfied. Therefore, the housing or the terminal-post body does not need to be designed as a complex compound structure or the like for insulating and sealing, thereby simplifying designs and processing of the housing and the terminal-post body. In addition, because the insulating and sealing structure includes both the part disposed between the penetrating portion and the housing and the part disposed between the abutting portion and the housing, disposition stability of the insulating and sealing structure and sufficiency of insulating and sealing can be improved, thereby improving reliability of achieving an insulating and sealing effect by the insulating and sealing structure.

In some embodiments, a first corner disposed toward the housing is provided at a position at which the abutting portion is connected to the penetrating portion, a corner of the housing that is disposed close to the first corner is a second corner, and each of the insulating and sealing structures includes a third corner disposed corresponding to the first corner and a fourth corner disposed corresponding to the second corner. At least one of the first corner, the second corner, the third corner, and the fourth corner is formed as a chamfer.

In the foregoing technical solution, a right angle is replaced with the chamfer, to increase a force-bearing area or a force-applying area, reduce a local pressure and stress concentration, reduce a cracking risk of the insulating and sealing structure at the third corner or the fourth corner at which the insulating and sealing structure is prone to cracking, improve structural stability of the insulating and sealing structure, and further improve the reliability of achieving the insulating and sealing effect by the insulating and sealing structure.

In some embodiments, the first corner disposed toward the housing is provided at the position at which the abutting portion is connected to the penetrating portion, and the corner of the housing that is disposed close to the first corner is the second corner. Each of the insulating and sealing structures includes the third corner disposed corresponding to the first corner and the fourth corner disposed corresponding to the second corner. There is a fitting gap between the first corner and the third corner, and/or there is a fitting gap between the second corner and the fourth corner.

In the foregoing technical solution, when there is the fitting gap between the first corner and the third corner, pressing of the first corner against the third corner can be reduced, thereby reducing a risk that the insulating and sealing structure is cracked at a position of the third corner. When there is the fitting gap between the second corner and the fourth corner, pressing of the second corner against the fourth corner can be reduced, thereby reducing a risk that the insulating and sealing structure is cracked at a position of the fourth corner.

In some embodiments, the first corner disposed toward the housing is provided at the position at which the abutting portion is connected to the penetrating portion, and the corner of the housing that is disposed close to the first corner is the second corner. Each of the insulating and sealing structures includes a first part and a second part. A material hardness of the first part is less than a material hardness of the second part. The first part is disposed closer to at least one of the first corner and the second corner than the second part.

In the foregoing technical solution, when the terminal-post body is assembled and fixed to the housing, the first part with a small material hardness is set at a position at which the insulating and sealing structure is prone to cracking. The first part is easily compressed and deformed by a force, and absorbs the force, so that a cracking risk herein can be reduced.

In some embodiments, the first part includes a first sub part. The first sub part is disposed closer to the first corner than the second part. The first sub part defines a part of a surface that is of the insulating and sealing structure and that is on a side facing the abutting portion, and/or defines a part of a surface that is of the insulating and sealing structure and that is on a side facing the penetrating portion.

In the foregoing technical solution, the first sub part is exposed on an outer surface of the insulating and sealing structure at a position close to the first corner, so that the first sub part can be better compressed and deformed by the force, which is more beneficial to relieving a cracking problem at the position. In addition, difficulty of combined processing of the first sub part and the second part can be reduced.

In some embodiments, the abutting portion and an end portion of the penetrating portion that is connected to the abutting portion form a first terminal-post portion. Each of the insulating and sealing structures includes a first insulating and sealing member fitted between the first terminal-post portion and the housing. A pad configured to buffer a force applied to the first insulating and sealing member by the first terminal-post portion is disposed between the first terminal-post portion and the housing.

In the foregoing technical solution, by disposing the pad, a damage caused to the first insulating and sealing member by an action force applied by the first terminal-post portion to the first insulating and sealing member can be reduced, thereby protecting the first insulating and sealing member and improving a cracking problem of the first insulating and sealing member.

In some embodiments, the pad is disposed between the housing and the first insulating and sealing member, and/or is disposed between the first terminal-post portion and the first insulating and sealing member.

In the foregoing technical solution, assembly of the pad is facilitated, and production difficulty is reduced. In addition, the first insulating and sealing member may be an integral member, thereby facilitating processing and assembly of the first insulating and sealing member.

In some embodiments, the pad includes at least one of a first pad, a second pad, and a third pad. The first pad is disposed between the abutting portion and the first insulating and sealing member, the second pad is disposed between the penetrating portion and the first insulating and sealing member, the third pad is disposed between the first insulating and sealing member and an outer surface of the housing, and a material hardness of the third pad is less than a material hardness of the first insulating and sealing member.

In the foregoing technical solution, when the first pad is disposed between the first insulating and sealing member and the abutting portion, when the terminal-post body is mounted to the housing, and the abutting portion presses against the first insulating and sealing member in a direction toward the housing, the first pad can reduce an action force conducted to the first insulating and sealing member, thereby reducing a damage caused to the first insulating and sealing member. When the second pad is disposed between the first insulating and sealing member and the penetrating portion, when the terminal-post body is mounted to the housing, and the penetrating portion presses against the first insulating and sealing member in the direction toward the housing, the second pad can reduce an action force conducted to the first insulating and sealing member, thereby reducing a damage caused to the first insulating and sealing member. When the third pad is disposed between the first insulating and sealing member and the housing, when the terminal-post body is mounted to the housing, and the terminal-post body presses against the first insulating and sealing member in the direction toward the housing, the first insulating and sealing member may conduct an action force to the third pad. Because the material hardness of the third pad is smaller, the third pad may be compressed and deformed, and absorb the force, to reduce a reaction force fed back to the first insulating and sealing member. In this way, the action force applied by the first terminal-post portion to the first insulating and sealing member is buffered, and a damage caused to the first insulating and sealing member is reduced.

In some embodiments, an accommodating groove open in the direction away from the accommodating cavity is formed on the terminal-post body. The sink groove is disposed around the accommodating groove and communicates with the accommodating groove. The terminal-post body is provided with a communicating hole. The communicating hole penetrates through a groove wall of the accommodating groove that is close to the accommodating cavity and communicates the accommodating cavity with the accommodating groove.

In the foregoing technical solution, when an electrolyte solution is injected to the battery cell, the electrolyte solution may be injected into the accommodating groove, and then flow toward the accommodating cavity through the communicating hole. The accommodating groove may buffer the electrolyte solution, to improve problems such as splashing and overflowing of the electrolyte solution. In addition, the side wall of the accommodating groove (that is, a groove wall extending from a notch of the accommodating groove in a direction toward the accommodating cavity) may block splashing of the electrolyte solution to some extent, thereby reducing pollution caused by the electrolyte solution to the outside, and facilitating quick liquid injection. In addition, because a liquid injection channel does not need to be separately disposed on the housing, special processing does not need to be performed on the housing, to help reduce structural complexity and processing difficulty of the housing.

In some embodiments, the battery cell includes a cell assembly. The cell assembly includes an active-material coating portion accommodated in the accommodating cavity and a conductive portion connected to the active-material coating portion. The conductive portion penetrates through the communicating hole to be at least partially accommodated in the accommodating groove.

In the foregoing technical solution, the conductive portion is at least partially accommodated in the accommodating groove, so that the conductive portion at least partially occupies space in the accommodating groove, thereby reducing space occupied by the conductive portion in the accommodating cavity, and saving space in the accommodating cavity to receive the active-material coating portion with a larger volume, to help improve an energy density of the battery cell, or help reduce a size of the battery cell when the energy density of the battery cell remains unchanged.

In some embodiments, a liquid injection hole capable of communicating with the accommodating groove is formed on the terminal-post cover plate, and the battery cell further includes a sealing structure configured to seal the liquid injection hole.

In the foregoing technical solution, the liquid injection hole is processed on the terminal-post cover plate, and the hole is small and is located outward. Therefore, reliable sealing on a liquid injection entrance can be easily implemented by using the sealing structure, working reliability of the battery cell is improved, and a flexible and diversified design of the sealing structure can be implemented.

According to a second aspect, an embodiment of the present application further provides a battery cell, including a housing, terminal-post bodies, and a terminal-post cover plate. The housing is provided with mounting holes, where an accommodating cavity is defined in the housing. The terminal-post body includes a penetrating portion penetrating through one of the mounting holes and an abutting portion abutting outside the housing. The abutting portion is connected to the penetrating portion and extends relative to the penetrating portion in a direction away from a central axis of the mounting holes. A sink groove open in a direction away from the accommodating cavity is formed between the abutting portion and the penetrating portion. The terminal-post cover plate covers the terminal-post bodies. An edge of the terminal-post cover plate is disposed in the sink groove, and welded to the penetrating portion in a penetrating manner. A welding structure formed through the welding is separated from the abutting portion.

In the foregoing technical solution, the edge of the terminal-post cover plate is disposed in the sink groove, and is welded to the penetrating portion in the penetrating manner, and the welding structure formed through the welding is separated from the abutting portion. Therefore, it is beneficial to improve a problem that the abutting portion warps due to the welding, improve reliability of abutting against the housing by the abutting portion, and further improve connection reliability and sealing tightness between the terminal-post bodies and the housing. Therefore, reliability of the battery cell can be improved.

According to a third aspect, an embodiment of the present application further provides a battery cell, including a housing, terminal-post bodies, and a terminal-post cover plate. The housing is provided with mounting holes. The terminal-post body penetrates through one of the mounting holes, and includes an abutting portion abutting outside the housing. The terminal-post cover plate covers the terminal-post bodies, and includes connection portions connected to the terminal-post bodies. When a surface perpendicular to an axial direction of the mounting holes is used as a projection surface and the axial direction of the mounting holes is used as a projection direction, a projection of a part of the abutting portion that abuts against the housing on the projection surface is separated from a projection of one of the connection portions on the projection surface.

In the foregoing technical solution, the projection of the part of the abutting portion that abuts against the housing on the projection surface is separated from the projection of one of the connection portions on the projection surface. Therefore, it is beneficial to improve a problem that the abutting portion warps due to the connection between the connection portion and the terminal-post body, improve reliability of abutting against the housing by the abutting portion, and further improve connection reliability and sealing tightness between the terminal-post bodies and the housing. Therefore, reliability of the battery cell can be improved.

In some embodiments, the terminal-post body includes a penetrating portion penetrating through one of the mounting holes, and the abutting portion is connected to the penetrating portion and extends relative to the penetrating portion in a direction away from the central axis of the mounting holes. A part of a projection of the abutting portion on the projection surface is located within a projection range of the mounting holes on the projection surface, and the projection of the connection portion on the projection surface is located within a projection range of the penetrating portion on the projection surface. The connection portion is disposed on the penetrating portion and connected to the penetrating portion.

In the foregoing technical solution, the connection portion may be further away from the part of the abutting portion that abuts against the housing, to further improve a problem that the part of the abutting portion that abuts against the housing warps.

According to a fourth aspect, an embodiment of the present application further provides a battery, including the battery cell in any one of the foregoing solutions.

In the foregoing technical solution, because reliability of the battery cell in this embodiment of the present application is improved, performance of the battery is improved.

According to a fifth aspect, an embodiment of the present application further provides a power consuming apparatus, including the battery in any one of the foregoing solutions.

In the foregoing technical solution, because performance of the battery is improved, it is beneficial to improve working power consuming performance of the power consuming apparatus.

BRIEF DESCRIPTION OF THE DRAWINGS

To provide a clearer explanation of the technical solution of the embodiments of the present application, a brief introduction will be given to the accompanying drawings required in the embodiments. It should be noted that only some embodiments of the present application are shown in the accompanying drawings, so that the accompanying drawings should not be considered as a limitation on a range. A person of ordinary skill in the art can obtain other related accompanying drawings based on the accompanying drawings without a creative work.

Figure 1:
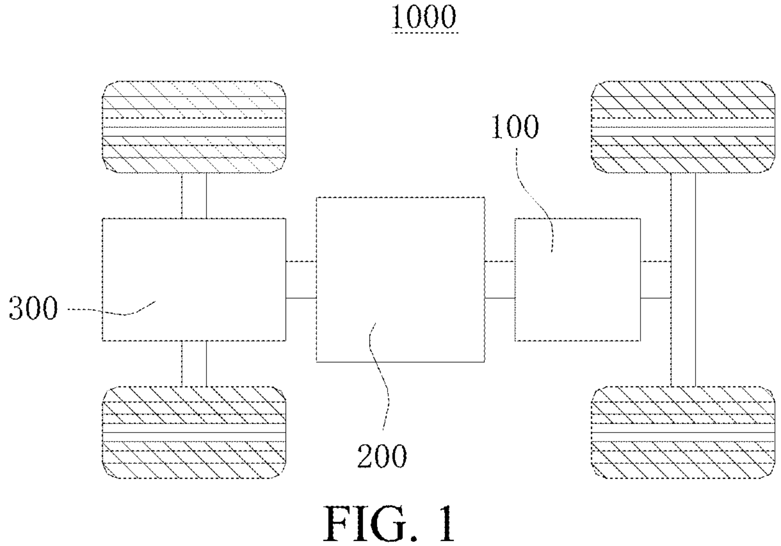
FIG. 1 is a schematic diagram of a structure of a vehicle according to some embodiments of the present application.

Reference numerals: vehicle 1000; first direction X; second direction Y; third direction Z; battery 100; controller 200; motor 300; box body 101; first box body 1011; second box body 1012; battery cell 102; busbar component 103; housing 1; accommodating cavity 11; mounting hole 12; central axis L; first housing wall 13; second corner 131 second housing wall 14; terminal post 2; terminal-post body 3; sink groove 31; side groove wall 311; bottom groove wall 312; abutting portion 32; first section 321; second section 322; penetrating portion 33; upper end portion 331; lower end portion 332; first corner 34; first terminal-post portion 35; accommodating groove 36; communicating hole 37; flange portion 38; second terminal-post portion 39; terminal-post cover plate 4; connection portion 41; outer surface 411 of the connection portion; cover plate body 42; liquid injection hole 43; first hole section 431; second hole section 432; third hole section 433; separation space S; welding structure 5; sealing structure 6; first sealing member 61; second sealing member 62; cell assembly 7; active-material coating portion 71; conductive portion 72; insulating and sealing structure 8; third corner 81; fourth corner 82; first part 83; first sub part 831; second subpart 832; second part 84; first insulating and sealing member 85; second insulating and sealing member 86; third insulating and sealing member 87; pad 9; first pad 91; second pad 92; and third pad 93.

DETAILED DESCRIPTION

To make objects, technical solutions, and advantages of embodiments of the present application clearer, the technical solutions in the embodiments of the present application are clearly described below with reference to the accompanying drawings of the embodiments of the present application. It is clear that the described embodiments are a part of the embodiments of the present application, rather than all of the embodiments. All other embodiments obtained by a person of ordinary skill in the art based on embodiments of the present application without creative efforts shall fall within the protection scope of the present application.

Unless otherwise defined, all technical and scientific terms used in the present application have same meanings as commonly understood by a person skilled in the technical field of the present application. The terms used in the specification of the present application are merely for an objective of describing specific embodiments, and are not intended to limit the present application. The terms "comprise", "include" and any variations thereof in the specification and claims of the present application and in the above descriptions of the accompanying drawings are intended to cover non-exclusive inclusion. The terms "first", "second", and the like in the specification, the claims, and the accompanying drawings of the present application are intended to distinguish between different objects, instead of describing a particular sequence or primary-secondary relationship.

Reference to "an embodiment" in the present application means that a particular feature, structure or characteristic described in combination with the embodiment may be included in at least one embodiment of the present application. Appearances of the phrase in various locations in this specification are not necessarily all referring to a same embodiment, nor are separate or alternative embodiments mutually exclusive of another embodiment.

In the descriptions of the present disclosure, it should be noted that, unless otherwise clearly specified and defined, terms such as "mounting", "interconnection", "connection", and "attachment" shall be understood in a broad sense, for example, may be a fixing connection, a detachable connection, an integral connection, a direct connection, an indirect connection by using an intermediate medium, and communication between interiors of two components. A person of ordinary skill in the art may understand specific meanings of the terms in the present disclosure according to specific situations.

The term "and/or" in the present application describes only an association relationship for describing associated objects and represents that three relationships may exist. For example, A and/or B may represent the following three cases: Only A exists, both A and B exist, and only B exists. In addition, in the present application, the character "/" usually indicates an "or" relationship between the associated objects.

In the embodiments of the present application, same reference numerals represent same components, and for brevity, detailed descriptions of the same components are omitted in different embodiments. It should be understood that dimensions, such as a thickness, a length, and a width, of each component in the embodiments of the present application and an entire thickness, length, and width of an integrated device shown in the accompanying drawings are merely exemplary descriptions, and should not be construed as any limitation to the present application.

"A plurality of" appearing in the present application means two or more (including two).

In the present application, a battery cell may include a lithium-ion secondary battery, a lithium-ion primary battery, a lithium-sulfur battery, a sodium-lithium-ion battery, a sodium-ion battery, a magnesium-ion battery, or the like. This is not limited in the embodiments of the present application. The battery cell may be cylindrical, flat, cuboid, or in other shapes. This is also not limited in the embodiments of the present application. Generally, battery cells are divided into three types according to encapsulating methods: cylindrical battery cells, square battery cells and soft package battery cells. This is also not limited in the embodiments of the present application.

A battery mentioned in embodiments of the present application is a single physical module including one or more battery cells to provide a higher voltage and a higher capacity. For example, the battery provided in the present application may include a battery module, a battery pack, or the like. The battery module usually includes a plurality of battery cells. The battery pack usually includes a box body for packaging one or more battery cells or one or more battery modules. The box body can prevent liquids or other foreign objects from affecting the charging or discharging of the battery cells.

The battery cell includes a housing, a cell assembly, and an electrolyte solution. The housing is configured to accommodate the cell assembly and the electrolyte solution. The cell assembly includes at least one electrode assembly. The electrode assembly includes a positive electrode plate, a negative electrode plate, and a separator. The electrode assembly may have a wound structure, a laminated structure, or the like. The battery cells work mainly relying on the movement of metal ions between the positive electrode plate and the negative electrode plate.

The positive electrode plate may usually include a positive electrode current collector and a positive electrode active substance layer, the positive electrode active substance layer is directly or indirectly coated to the positive electrode current collector, the positive electrode current collector not coated with the positive electrode active substance layer protrudes out of the positive electrode current collector already coated with the positive electrode active substance layer, and the positive electrode current collector not coated with the positive electrode active substance layer is used as a positive electrode tab. Using the lithium-ion battery as an example, a material of the positive electrode current collector may be aluminum, and a material of a positive electrode active substance may be lithium cobalt oxide, lithium iron phosphate, ternary lithium, lithium manganese oxide, or the like.

The negative electrode plate may usually include a negative electrode current collector and a negative electrode active substance layer, the negative electrode active substance layer is directly or indirectly coated to the negative electrode current collector, the negative electrode current collector not coated with the negative electrode active substance layer protrudes out of the negative electrode current collector already coated with the negative electrode active substance layer, and the negative electrode current collector not coated with the negative electrode active substance layer is used as a negative electrode tab. A material of the negative electrode current collector may be copper, and a material of the negative electrode active substance layer may be carbon, silicon, or the like.

To ensure that no fusing occurs when a large current passed through, there are a plurality of positive electrode tabs and the positive electrode tabs are laminated to form a positive electrode tab portion, and there are a plurality of negative electrode tabs and the negative electrode tabs are laminated to form a negative electrode tab portion. The housing is provided with a terminal post, the positive electrode tab portion is electrically connected to a positive electrode terminal post, and the negative electrode tab portion is electrically connected to a negative electrode terminal post. For example, the tab portion may be connected to the terminal post, to form direct electrical connection between the tab portion and the terminal post. For another example, the cell assembly may include an adapter, the tab portion is connected to the adapter, and the adapter is connected to the terminal post, to form indirect electrical connection between the tab portion and the terminal post.

A material of the separator is not limited, and may be, for example, polypropylene or polyethylene.

In some battery cells in the related technology, a housing is provided with a terminal post, and the terminal post is electrically connected to a cell assembly in the housing, to implement an output of an electrode. When the terminal post includes a terminal-post body and a terminal-post cover plate, the terminal-post body is mounted on the housing, the terminal-post cover plate covers the terminal-post body, and an edge of the terminal-post cover plate is welded to an edge of the terminal-post body. When a molten pool formed by the welding shrinks, the edge of the terminal-post body easily warps, which negatively affects connection reliability and sealing tightness between the terminal-post body and the housing. In addition, when a busbar component needs to be welded on the terminal-post cover plate, if the edge of the terminal-post body warps, assembly and connection of the busbar component to the terminal-post cover plate may be affected.

In view of this, an embodiment of the present application provides a battery cell, including a housing, terminal-post bodies, and a terminal-post cover plate. The housing is provided with mounting holes. An accommodating cavity is defined in the housing. The terminal-post bodies penetrate through the mounting holes. The terminal-post body includes an abutting portion abutting outside the housing. A sink groove is provided at an end portion of the terminal-post body that is away from the accommodating cavity. The sink groove is disposed closer to a central axis of the mounting holes than the abutting portion. The terminal-post cover plate covers the terminal-post bodies, and includes connection portions connected to the terminal-post bodies. Each of the connection portions is disposed at the sink groove, is connected to a part that is of one of the terminal-post bodies and that is located at the sink groove and close to a side of the accommodating cavity, and is separated from a groove wall of the sink groove close to the abutting portion.

Therefore, each of the connection portions is connected to the part that is of one of the terminal-post bodies and that is located at the sink groove and close to the side of the accommodating cavity, and the connection portion is separated from the groove wall of the sink groove close to the abutting portion, to form separation space. In this way, not only a connection requirement between the terminal-post cover plate and the terminal-post bodies can be satisfied, but also a force generated when the terminal-post cover plate is connected to the terminal-post body can be blocked by the separation space, to reduce transmission of the force to the abutting portion. This helps improve a problem that the abutting portion warps due to the force, improve reliability of abutting between the abutting portion and the housing, and further improve connection reliability and sealing tightness between the terminal-post bodies and the housing. Therefore, reliability of the battery cell can be improved.

In addition, the problem that the abutting portion warps can be improved, so that it is beneficial to improve a problem that assembly and connection of a busbar component are affected because the abutting portion warps, and improve smoothness and reliability of connection between the busbar component and the terminal-post cover plate. In addition, the connection portion of the terminal-post cover plate that is connected to the terminal-post body is separated from the groove wall of the sink groove close to the abutting portion, so that a requirement on an assembly gap between the terminal-post cover plate and the terminal-post body can be reduced, a requirement on processing precision of the terminal-post cover plate can be reduced, and compatibility of the terminal-post body can be increased.

An embodiment of the present application provides a power consuming apparatus using a battery as a power supply. The power consuming apparatus may be, but is not limited to, a mobile phone, a tablet computer, a notebook computer, an electric toy, an electric tool, an electric scooter, an electric vehicle, a ship, a spacecraft, or the like. The electric toy may include a fixed or mobile electric toy, for example, a game console, an electric vehicle toy, an electric ship toy, and an electric airplane toy. The spacecraft may include an airplane, a rocket, a spacecraft, a space ship, and the like.

For ease of description, the following embodiments are described by using an example in which a power consuming apparatus in an embodiment of the present application is a vehicle 1000.

FIG. 1 is a schematic diagram of a structure of a vehicle 1000 according to some embodiments of the present application. A vehicle 1000 may be a fuel powered vehicle, a gas powered vehicle, or a new energy vehicle. The new energy vehicle may be a pure electric vehicle, a hybrid electric vehicle, or an extended range vehicle, etc. The inner part of the vehicle 1000 is provided with a battery 100. The battery 100 may be arranged at the bottom, head, or tail of the vehicle 1000. The battery 100 may be configured to supply power to the vehicle 1000. For example, the battery 100 may be used as a power supply for operating the vehicle 1000. The vehicle 1000 may further include a controller 200 and a motor 300. The controller 200 is configured to control the battery 100 to supply power to the motor 300, for example, to meet working power requirements during starting, navigation, and traveling of the vehicle 1000.

In some embodiments of the present application, the battery 100 can not only serve as a power supply for operating the vehicle 1000, but can also serve as a power supply for driving the vehicle 1000, in place of or partially in place of fuel or natural gas, to provide driving power for the vehicle 1000.

Figure 2:
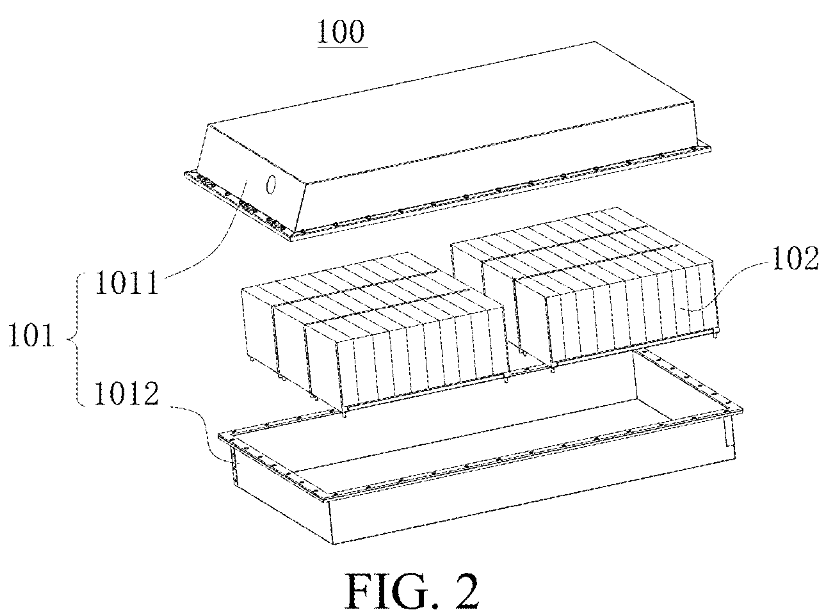
FIG. 2 is an exploded view of a structure of a battery according to some embodiments of the present application.

FIG. 2 is an exploded view of a structure of a battery 100 according to some embodiments of the present application. The battery 100 includes a box body 101 and a plurality of battery cells 102, where the battery cells 102 are accommodated in the box body 101. The box body 101 is configured to provide assembly space for the battery cells 102. The box body 101 may use various structures. In some embodiments, the box body 101 may include a first box body 1011 and a second box body 1012, the first box body 1011 and the second box body 1012 cover each other, and the first box body 1011 and the second box body 1012 jointly define the assembly space for accommodating the battery cells 102. The second box body 1012 may be a hollow structure with one end being open, the first box body 1011 may be a plate-like structure, and the first box body 1011 covers an open side of the second box body 1012, so that the first box body 1011 and the second box body 1012 jointly define the assembly space. Alternatively, the first box body 1011 and the second box body 1012 each may be a hollow structure with one side being open, and an open side of the first box body 1011 covers an open side of the second box body 1012. Certainly, the box body 101 formed by the first box body 1011 and the second box body 1012 may be in various shapes, such as a cylinder, and a cuboid.

In the battery 100, the plurality of battery cells 102 may be connected in series, parallel, or series-parallel. Series-parallel connection means that both series connection and parallel connection exist among the plurality of battery cells 102. The plurality of battery cells 102 may be directly connected in series, parallel, or series-parallel together, and then the whole formed by the plurality of battery cells 102 may be accommodated in the box body 101. Certainly, the battery 100 may alternatively be in a form of a battery module formed by the plurality of battery cells 102 that are first connected in series, parallel, or series-parallel. The plurality of battery modules are then connected in series, parallel, or series-parallel to form a whole and accommodated in the box body 101. The battery 100 may also include other structures, for example, the battery 100 may also include a busbar component for achieving electrical welding between the plurality of battery cells 102.

Each of the battery cells 102 may be a secondary battery or a primary battery, or may be a lithium-sulfur battery, a sodium-ion battery, or a magnesium-ion battery, but is not limited thereto. The battery cell 102 may be cylindrical, flat, cuboid, or the like. For example, referring to the embodiment shown in FIG. 3, a length direction of the battery cell 102 is a first direction X, a width direction of the battery cell 102 is a second direction Y, and a height direction of the battery cell 102 is a third direction Z. Every two of the first direction X, the second direction Y, and the third direction Z are perpendicular to each other.

Figures 3, 4:
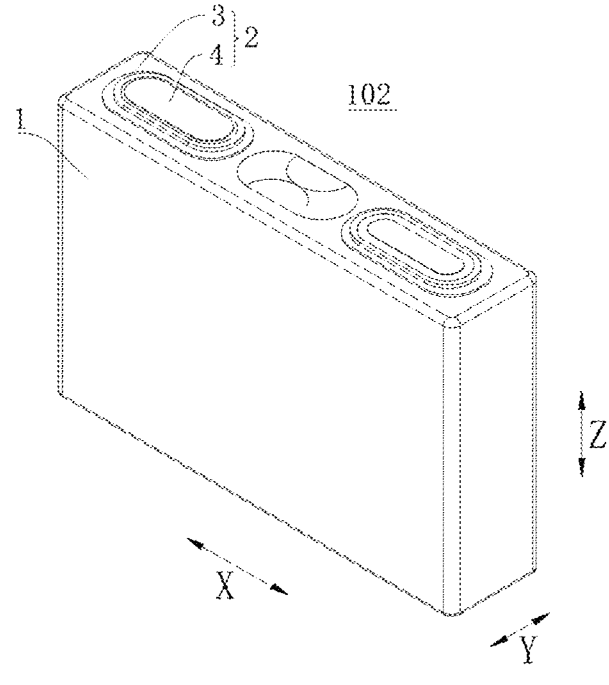
FIG. 3 is a schematic diagram of a structure of a battery cell according to some embodiments of the present application.
FIG. 4 is a schematic diagram of an orthographic projection of a battery cell according to some embodiments of the present application.
Figure 5:
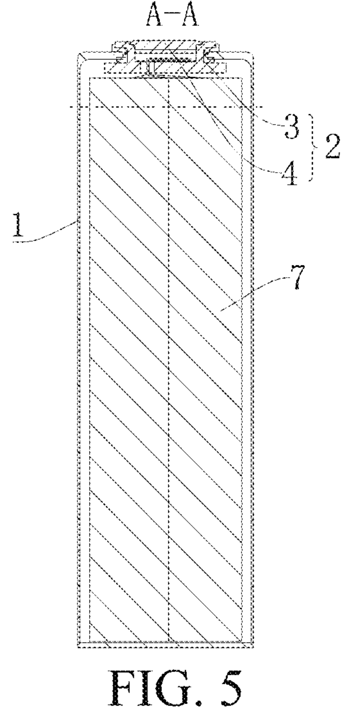
FIG. 5 is a cross-sectional view along a line A-A in FIG. 4.
Figure 6:
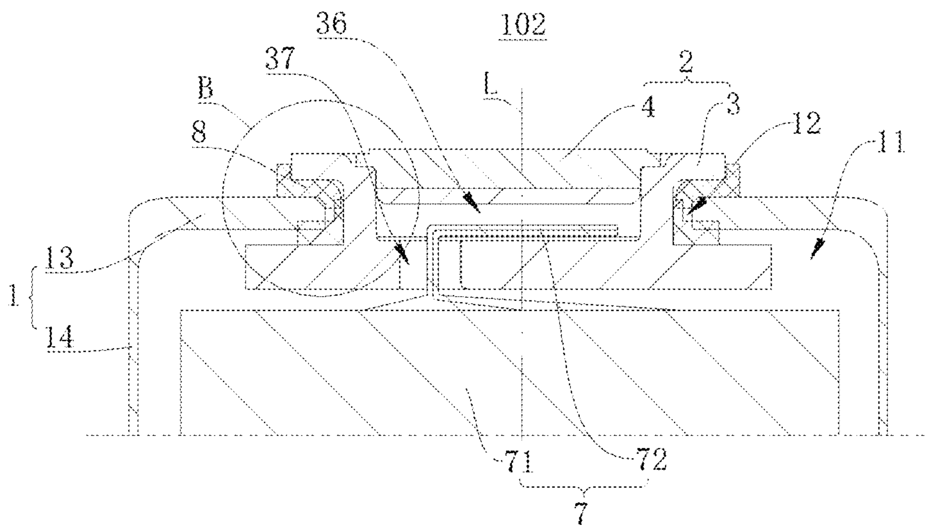
FIG. 6 is a partial enlarged view of FIG. 5.
Figure 7:
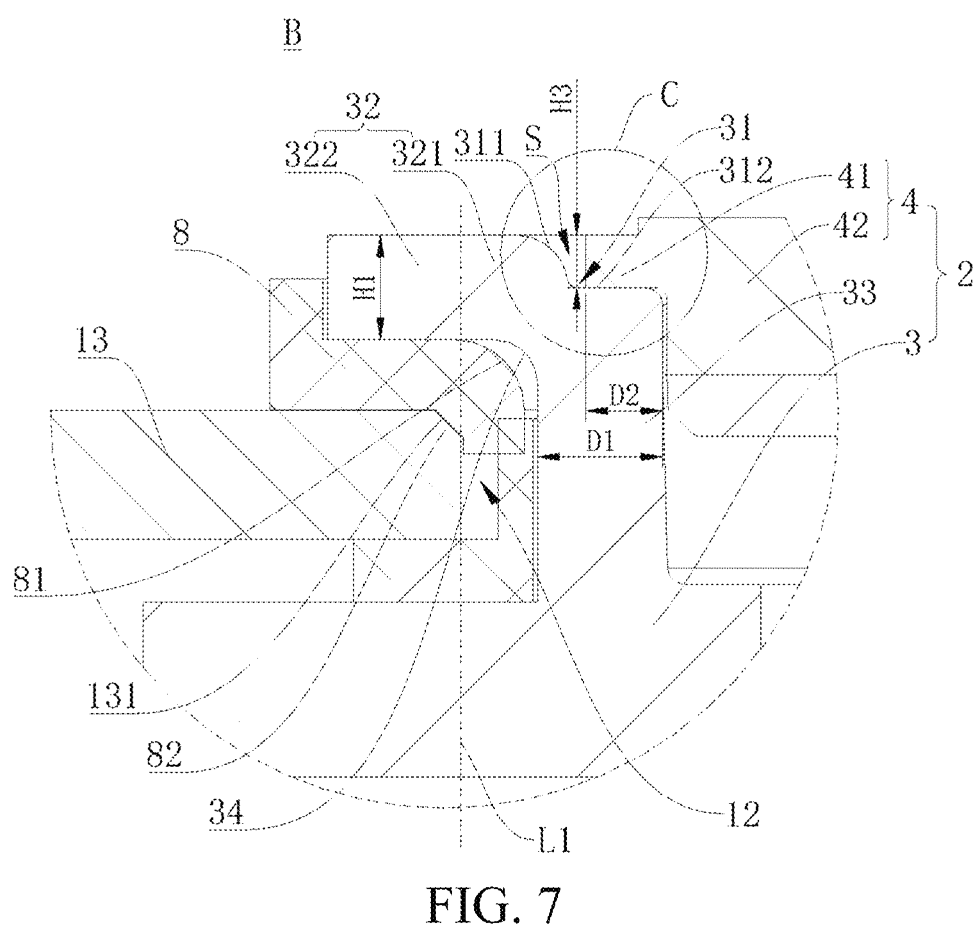
FIG. 7 is a partial enlarged view of a part B circled in FIG. 6.

According to an embodiment of a first aspect of the present application, a battery cell 102 is provided. With reference to FIG. 4 to FIG. 6, the battery cell 102 includes a housing 1 and a terminal post 2. The terminal post 2 is disposed in the housing 1. An accommodating cavity 11 is formed inside the housing 1. For example, the battery cell 102 includes a cell assembly 7. The cell assembly 7 may include an active-material coating portion 71 and a conductive portion 72 connected to the active-material coating portion 71. The active-material coating portion 71 is accommodated in the accommodating cavity 11, and the conductive portion 72 is welded to the terminal post 2, so that the conductive portion 72 is electrically connected between the active-material coating portion 71 and the terminal post 2. With reference to FIG. 6 and FIG. 7, the terminal post 2 includes terminal-post bodies 3 and a terminal-post cover plate 4 covering the terminal-post bodies 3. The conductive portion 72 may be welded to the terminal-post bodies 3, or the conductive portion 72 may be welded to the terminal-post cover plate 4, so that electrical connection between the conductive portion 72 and the terminal post 2 can be implemented.

With reference to FIG. 6 and FIG. 7, the housing 1 is provided with mounting holes 12. When the housing 1 is not assembled with another component, the mounting holes 12 are in communication with the accommodating cavity 11. The terminal-post bodies 3 penetrate through the mounting holes 12, and the terminal-post body 3 includes an abutting portion 32 abutting outside the housing 1. In other words, the abutting portion 32 is at least partially in direct or indirect contact with a side wall surface (that is, an outer wall surface of the housing 1) of the housing 1 that is away from the accommodating cavity 11, to present an abutting relationship. Therefore, under blocking of the housing 1, the terminal-post body 3 is prevented from moving relative to the housing 1 in a direction toward the accommodating cavity 11. For example, the housing 1 includes a first housing wall 13, the mounting holes 12 are formed on the first housing wall 13. When an axial direction of the mounting holes 12 is used as a projection direction and a surface perpendicular to the axial direction of the mounting holes 12 is used as a projection surface, there is an overlapping region between a projection of the abutting portion 32 on the projection surface and a projection of the first housing wall 13 on the projection surface, and a part of the abutting portion 32 that corresponds to the overlapping region is in direct or indirect contact with the housing 1, to present the abutting relationship.

It should be noted that the terminal-post body 3 may abut against the outer wall surface of the housing 1 not only by using the abutting portion 32. For example, in some embodiments, a partial structure of the terminal-post body 3 that is located outside the housing 1 and that is configured to define a bottom groove wall 312 of a sink groove 31 also abuts against the outer wall surface of the housing 1. Therefore, in this embodiment of the present application, the terminal-post body 3 may abut against the outer wall surface of the housing 1 only by using the abutting portion 32, or may abut against the outer wall surface of the housing 1 by using both the abutting portion 32 and another portion other than the abutting portion 32.

In addition, in some embodiments of the present application, the terminal-post body 3 may also have a part that abuts against the housing 1, that is, a part of the terminal-post body 3 is in direct or indirect contact with a side wall surface (that is, an inner wall surface of the housing 1) of the housing 1 that is close to the accommodating cavity 11. Alternatively, the terminal-post body 3 may not extend into the housing 1, and includes only a part that penetrates through the mounting hole 12 and a part that is located outside the housing 1. This is not limited herein.

With reference to FIG. 6 and FIG. 7, the sink groove 31 is provided at an end portion of the terminal-post body 3 that is away from the accommodating cavity 11, and the sink groove 31 is disposed closer to a central axis L of the mounting holes 12 than the abutting portion 32. The sink groove 31 hollows in the direction toward the accommodating cavity 11 and is open in a direction away from the accommodating cavity 11. A notch of the sink groove 31 is located on a surface of the terminal-post body 3 on a side away from the accommodating cavity 11. The sink groove 31 is disposed around the central axis L of the mounting holes 12. The abutting portion 32 is disposed farther to the central axis L of the mounting holes 12 than the sink groove 31.

With reference to FIG. 6 and FIG. 7, the terminal-post cover plate 4 covers the terminal-post bodies 3, and includes connection portions 41 connected to the terminal-post bodies 3. Each of the connection portions 41 is disposed at the sink groove 31, is connected to a part that is of one of the terminal-post bodies 3 and that is located at the sink groove 31 and close to a side of the accommodating cavity 11, and is separated from a groove wall of the sink groove 31 close to the abutting portion 32. For example, a part of the terminal-post cover plate 4 may be disposed on the bottom groove wall 312 of the sink groove 31. The bottom groove wall 312 is a surface of the sink groove 31 on a side close to the accommodating cavity 11. The part of the terminal-post cover plate 4 is connected to the terminal-post body 3, for example, through welding penetrating through the bottom groove wall 312, through bonding to the bottom groove wall 312, or is connected by using a fastener penetrating through the bottom groove wall 312, so that the terminal-post cover plate 4 is connected to the terminal-post body 3. The part of the terminal-post cover plate 4 is the connection portion 41. There is separation space S between the connection portion 41 and a side groove wall 311 of the sink groove 31, and the side groove wall 311 is a surface of the sink groove 31 close to the abutting portion 32. It should be noted that, when the part of the terminal-post cover plate 4 is connected to the terminal-post body 3 through welding penetrating through the bottom groove wall 312, the connection portion 41 may be formed into a solidified structure formed by solidifying a molten pool. In this case, that the connection portion 41 is separated from the groove wall of the sink groove 31 close to the abutting portion 32 means that the solidified structure is separated from the groove wall of the sink groove 31 close to the abutting portion 32.

Therefore, each of the connection portions 41 is connected to the part that is of one of the terminal-post bodies 3 and that is located at the sink groove 31 and close to the side of the accommodating cavity 11, and the connection portion 41 is separated from the groove wall of the sink groove 31 close to the abutting portion 32, to form separation space S. In this way, not only a connection requirement between the terminal-post cover plate 4 and the terminal-post bodies 3 can be satisfied, but also a force generated when the terminal-post cover plate 4 is connected to the terminal-post body 3 can be blocked by the separation space S, to reduce transmission of the force to the abutting portion 32. This helps improve a problem that the abutting portion 32 warps due to the force, improve reliability of abutting between the abutting portion 32 and the housing 1, and further improve connection reliability and sealing tightness between the terminal-post bodies 3 and the housing 1. Therefore, reliability of the battery cell 102 can be improved.

In addition, the problem that the abutting portion 32 warps can be improved, so that it is beneficial to improve a problem that assembly and connection of a busbar component 103 are affected because the abutting portion 32 warps, and improve smoothness and reliability of connection between the busbar component 103 and the terminal-post cover plate 4. In addition, the connection portion 41 of the terminal-post cover plate 4 that is connected to the terminal-post body 3 is separated from the groove wall of the sink groove 31 close to the abutting portion 32, so that a requirement on an assembly gap between the terminal-post cover plate 4 and the terminal-post body 3 can be reduced, a requirement on processing precision of the terminal-post cover plate 4 can be reduced, and compatibility of the terminal-post body 3 can be increased.

In some embodiments of the present application, the connection portions 41 are welded to the part that is of one of the terminal-post bodies 3 and that is located at the sink groove 31 and close to the side of the accommodating cavity 11. Therefore, the connection portions 41 are connected to the terminal-post bodies 3 through welding, so that connection reliability between the terminal-post bodies 3 and the terminal-post cover plate 4 can be improved, and another component for connection can be omitted, thereby simplifying a structure and reducing costs.

It should be noted that, if the terminal-post cover plate is welded to the groove wall of the sink groove close to the abutting portion to form the molten pool, a shrinking stress generated due to the solidification of the molten pool is directly conducted to the abutting portion. Because a shrinking stress of solidification on a side of the molten pool away from the accommodating cavity is larger, the abutting portion easily warps. In addition, if the terminal-post cover plate needs to be welded to the groove wall of the sink groove close to the abutting portion, it needs to be ensured that an assembly gap between the terminal-post cover plate and the terminal-post body satisfies a welding requirement, causing poor compatibility of the terminal-post body and high processing precision requirements of the terminal-post body and the terminal-post cover plate.

However, in this embodiment of the present application, because the connection portions 41 are welded to the part that is of one of the terminal-post bodies 3 and that is located at the sink groove 31 and close to the side of the accommodating cavity 11, and after a molten pool is formed in each of the connection portions 41 and solidified, the connection portion 41 is separated from the groove wall of the sink groove 31 close to the abutting portion 32, the shrinking stress generated due to the solidification of the molten pool can be blocked, and is hardly or rarely conducted to the abutting portion 32. Therefore, the problem that the abutting portion 32 warps can be improved. In addition, because the connection portion 41 penetrates through the bottom groove wall 312 through welding, instead of being welded to the side groove wall 311, the assembly gap between the connection portion 41 and the side groove wall 311 does not need to be ensured to satisfy the welding requirement, so that a gap between the connection portion 41 and the side groove wall 311 may be large, thereby improving the compatibility of the terminal-post body 3, and facilitating reducing processing precision of the terminal-post cover plate 4 and the terminal-post body 3.

In some embodiments of the present application, with reference to FIG. 6 and FIG. 7, an edge of the terminal-post cover plate 4 is formed as the connection portion 41. In other words, the connection portion 41 is located at the edge of the terminal-post cover plate 4. Therefore, when the connection portion 41 is connected to the terminal-post body 3, there is no part of the terminal-post cover plate 4 that is located at a periphery of the connection portion 41 and that is close to the side groove wall of the sink groove 31 close to the abutting portion 32, so that the problem that the abutting portion 32 warps when the force generated when the terminal-post cover plate 4 is connected to the terminal-post body 3 is conducted to the abutting portion 32 can be further improved.

In some embodiments of the present application, with reference to FIG. 6 and FIG. 7, the terminal-post body 3 includes a penetrating portion 33 penetrating through one of the mounting holes 12, and at least a part of one of the connection portions 41 is disposed on the penetrating portion 33 and connected to the penetrating portion 33. When the axial direction of the mounting holes 12 is used as the projection direction and the surface perpendicular to the axial direction of the mounting holes 12 is used as a projection surface, a projection of the penetrating portion 33 on the projection surface falls within a projection range of the mounting hole 12 on the projection surface. A surface of the penetrating portion 33 that is away from the accommodating cavity 11 defines at least a part of the bottom groove wall 312 of the sink groove 31.

Therefore, at least a part of one of the connection portions 41 is disposed on the penetrating portion 33 and connected to the penetrating portion 33. Because the penetrating portion 33 penetrates through one of the mounting holes 12, in an axial direction of the mounting holes 12, the penetrating portion 33 may have a sufficient size to be connected to the connection portion 41. In this way, it is beneficial to improve the connection reliability between the terminal-post bodies 3 and the terminal-post cover plate 4. For example, when the connection portion 41 is welded to the penetrating portion 33, a depth of fusion is sufficient, so that welding reliability between the connection portion 41 and the penetrating portion 33 is improved. For another example, when the penetrating portion 33 and the connection portion 41 are connected by using a fastener, a depth by which the fastener extends into the penetrating portion 33 is sufficient, so that the connection reliability between the terminal-post bodies 3 and the terminal-post cover plate 4 can be improved. In addition, because a position at which the connection portion 41 is connected to the penetrating portion 33 is close to the mounting hole 12, the position may be away from a position at which the abutting portion 32 abuts against the housing 1, thereby further improving the problem that the abutting portion 32 warps.

In some embodiments of the present application, with reference to FIG. 7, the penetrating portion 33 is annular, and a radial width D2 by which each of the connection portions 41 covers one of the terminal-post bodies 3 is less than a radial wall thickness D1 of the penetrating portion 33. The radial wall thickness D1 is a radial wall thickness of one end of the penetrating portion 33 away from the accommodating cavity 11, and the radial width D2 is a width by which the connection portion 41 covers the terminal-post body 3 and on a single side in a radial direction of the penetrating portion 33. Therefore, when the penetrating portion 33 is annular, the radial width D2 by which each of the connection portions 41 covers one of the terminal-post bodies 3 is set to be less than the radial wall thickness D1 of the penetrating portion 33, so that the radial wall thickness of the penetrating portion 33 is sufficient to support the connection portion 41 and the penetrating portion 33 is connected to the connection portion 41, thereby improving the connection reliability between the terminal-post bodies 3 and the terminal-post cover plate 4. For example, when the connection portion 41 is welded to the penetrating portion 33, the connection portion 41 may be welded to only the penetrating portion 33, and a depth of fusion is sufficient at the connection portion, so that the welding reliability between the connection portion 41 and the penetrating portion 33 is improved.

Certainly, the present application is not limited thereto. For example, in another embodiment of the present application, when the penetrating portion 33 is annular, the radial dimension D2 by which the connection portion 41 covers the penetrating portion 33 may alternatively be greater than the radial wall thickness D1 of the penetrating portion 33. In this case, only a part of the connection portion 41 is disposed on the penetrating portion 33, and the part is connected to the penetrating portion 33. Meanwhile, a part of the connection portion 41 may further extend to a side of the penetrating portion 33 away from the central axis L of the mounting holes 12, and is connected to the part of the terminal-post body 3. In this case, a part of the bottom groove wall 312 of the sink groove 31 is defined on a surface of the penetrating portion 33 away from the accommodating cavity 11, and a remaining part of the bottom groove wall 312 of the sink groove 31 is defined by another structure of the terminal-post body 3.

For example, in some other embodiments, the terminal-post body 3 further includes a linking portion (which is not shown in the figure) connected between the abutting portion 32 and the penetrating portion 33. The linking portion also abuts against the outer wall surface of the housing 1. The linking portion and the penetrating portion 33 jointly define the bottom groove wall 312 of the sink groove 31. The connection portion 41 is disposed on the linking portion and the penetrating portion 33, and is separately welded to the linking portion and the penetrating portion 33.

In some embodiments of the present application, with reference to FIG. 7, the abutting portion 32 is connected to the penetrating portion 33 and extends relative to the penetrating portion 33 in a direction away from the central axis L of the mounting holes 12, and the abutting portion 32 protrudes from the penetrating portion 33 in a direction away from the accommodating cavity 11 (to be specific, a surface of the abutting portion 32 away from the accommodating cavity 11 protrudes, from the surface of the penetrating portion 33 away from the accommodating cavity 11, in the direction away from the accommodating cavity 11, or in brief, an outer surface of the abutting portion 32 protrudes outward from an outer surface of the penetrating portion 33), to define the sink groove 31 between a surface of the abutting portion 32 that is close to the central axis L of the mounting holes 12 and the surface of the penetrating portion 33 that is away from the accommodating cavity 11. In this case, the side groove wall 311 of the sink groove 31 may be defined by the surface of the abutting portion 32 that is close to the central axis L of the mounting holes 12, and the bottom groove wall 312 of the sink groove 31 may be defined by the surface of the penetrating portion 33 that is away from the accommodating cavity 11.

Therefore, the sink groove 31 is jointly defined by the abutting portion 32 and the penetrating portion 33, so that a structure of the terminal-post bodies 3 can be simplified, and the sink groove 31 can be easily designed and processed. In addition, in comparison with a solution of "hollowing a part of the surface of the penetrating portion 33 away from the accommodating cavity 11 to form the sink groove 31", a radial outer edge of the sink groove 31 may extend in the direction away from the central axis L of the mounting holes 12, to facilitate fitting with the connection portion 41 of the terminal-post cover plate 4, thereby facilitating satisfying a requirement of disposing the side groove wall 311 of the sink groove 31 spaced away with the connection portion 41.

In some embodiments, as shown in FIG. 7, a depth H3 of the sink groove 31 in an axial direction of the mounting holes 12 ranges from one third to two thirds of a thickness H1 of the abutting portion 32 in the axial direction of the mounting holes 12. That is, H3 ranges from ⅓ to ⅔ of H1. Therefore, the depth of the sink groove 31 is not excessively large, to ensure a sufficient wall thickness at a position at which the abutting portion 32 is connected to the penetrating portion 33, so as to improve structural strength of a weak position of the terminal-post body 3. In addition, the depth of the sink groove 31 is not excessively small, so that the connection portion 41 can be accommodated in the sink groove 31 to a large extent, thereby reducing a volume by which the connection portion 41 protrudes out of the sink groove 31, and improving interference caused by the protrusion of the connection portion 41 on the assembly and connection of the busbar component 103.

Figure 8:
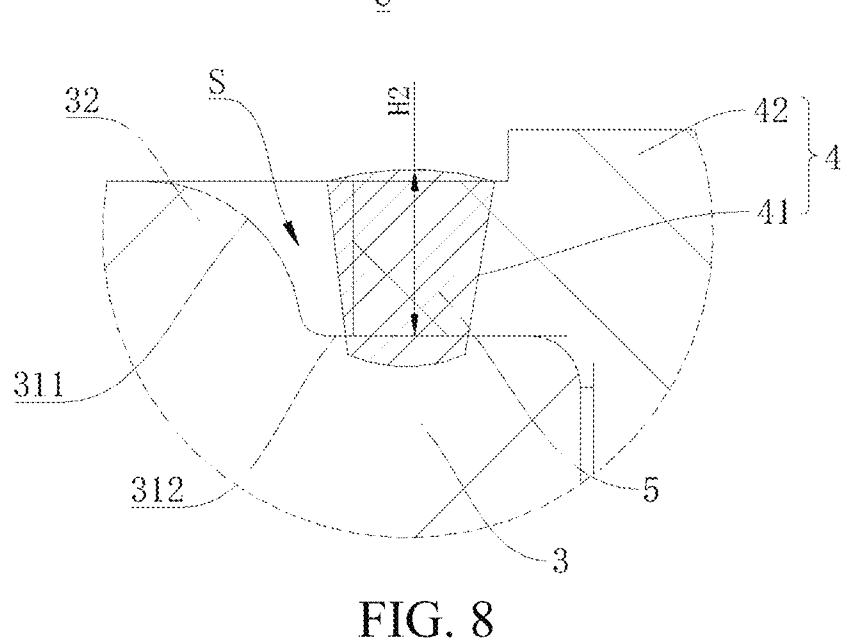
FIG. 8 is a partial enlarged view of a part C circled in FIG. 7.

In some embodiments of the present application, as shown in FIG. 7 and FIG. 8, when the depth H3 of the sink groove 31 in the axial direction of the mounting holes 12 is less than the thickness H1 of the abutting portion 32 in the axial direction of the mounting holes 12, if the thickness H2 of each of the connection portions 41 in the axial direction of the mounting holes 12 is close to the depth H3 of the sink groove 31 in the axial direction of the mounting holes 12, the connection portion 41 may be roughly accommodated in the sink groove 31, to reduce an interference impact on the assembly of the busbar component 103 caused by the connection portion 41 protruding from the outer surface of the abutting portion 32.

In some embodiments, when the penetrating portion 33 is annular, and a side of the sink groove 31 close to the central axis L of the mounting holes 12 may be open, to communicate with an inner annular region of the penetrating portion 33. Therefore, when the penetrating portion 33 is annular, the side of the sink groove 31 close to the central axis L of the mounting holes 12 is open to communicate with the inner annular region of the penetrating portion 33, so as to further simplify a design and processing of the sink groove 31. In comparison with a solution in which "when the penetrating portion 33 is annular, the side of the sink groove 31 close to the central axis L of the mounting holes 12 is closed", a radial inner edge of the sink groove 31 may extend in a direction approaching the central axis L of the mounting holes 12, to facilitate fitting with the terminal-post cover plate 4, thereby facilitating simplifying a structural design of the terminal-post cover plate 4.

In some embodiments, as shown in FIG. 7, the abutting portion 32 includes a first section 321 (for example, a part on the right of an auxiliary line L1 shown in FIG. 7) and a second section 322 (for example, a part on the left of the auxiliary line L1 shown in FIG. 7) that are sequentially disposed in a direction away from the penetrating portion 33. When the surface perpendicular to the axial direction of the mounting holes 12 is used as the projection surface and the axial direction of the mounting holes 12 is used as the projection direction, a projection of the first section 321 on the projection surface is located inside a projection of one of the mounting holes 12 on the projection surface, and a projection of the second section 322 on the projection surface is located outside the projection of the mounting hole 12 on the projection surface.

Therefore, the second section 322 may abut against the housing 1, to satisfy a requirement that the terminal-post body 3 abuts against and fits the housing 1. In addition, the first section 321 that is not configured to abut against the housing 1 further exists between the second section 322 and the sink groove 31, and the first section 321 is used to define the side groove wall 311 of the sink groove 31. Therefore, a problem that the second section 322 warps due to connection between the connection portion 41 and the penetrating portion 33 can be improved, thereby facilitating improving reliability of fitting between the abutting portion 32 and the housing 1.

Certainly, the present application is not limited thereto. For example, in another embodiment of the present application, a projection of the abutting portion 32 on the projection surface may alternatively be set to be entirely located outside the projection of the mounting hole 12 on the projection surface. In this case, the abutting portion 32 and the penetrating portion 33 may be connected by using a linking portion (which is not shown in the figure). In this case, the abutting portion 32 still defines the side groove wall 311 of the sink groove 31, but the linking portion and the penetrating portion 33 jointly define the bottom groove wall 312 of the sink groove 31. The connection portion 41 is disposed on the linking portion and the penetrating portion 33, and is separately welded to the linking portion and the penetrating portion 33.

In some embodiments of the present application, as shown in FIG. 7, the abutting portion 32 is formed on the terminal-post body 3 through flange riveting. In other words, after the terminal-post body 3 is assembled to the mounting hole 12, the abutting portion 32 is manufactured by using a process of flange riveting. Therefore, processing of the terminal-post bodies 3 is convenient, and the sink groove 31 can be easily obtained. In addition, when the abutting portion 32 is connected to the penetrating portion 33, it is beneficial to improve connection reliability between the abutting portion 32 and the penetrating portion 33, and improve assembly reliability between the terminal-post body 3 and the housing 1. Certainly, the present application is not limited thereto. For example, in another embodiment of the present application, the terminal-post body 3 may alternatively be formed by welding two parts together. For example, the two parts are separately assembled to the mounting hole 12, and then the two parts are welded together.

In some embodiments of the present application, as shown in FIG. 7, a distance between each of the connection portions 41 and the groove wall of the sink groove 31 close to the abutting portion 32 gradually increases in a direction (for example, a direction from the bottom to the top shown in FIG. 7) away from the accommodating cavity 11. Therefore, because the distance between each of the connection portions 41 and the side groove wall 311 of the sink groove 31 gradually increases in the direction away from the accommodating cavity 11, assembly of the connection portion 41 to the sink groove 31 is facilitated, and a position with a large interval is correspondingly welded to a position that is of the molten pool and that is greatly solidified, shrunken, and deformed, to facilitate further improving, by setting the large interval, the problem that the abutting portion 32 warps. In addition, a position with a small interval is beneficial to improve structural strength of a position that has a small wall thickness and that is formed by providing a groove in the terminal-post body 3. It may be understood that, when the connection portion 41 is welded to the penetrating portion 33 to form the molten pool, a shrinking stress on a side of the molten pool away from the accommodating cavity 11 is larger, and an interval corresponding to this position is set to be larger, to help reduce warping of the abutting portion 32 caused by heat and the shrinking stress at this position.

In some embodiments of the present application, as shown in FIG. 7, a cross-sectional area of the sink groove 31 gradually increases in the direction (for example, the direction from the bottom to the top shown in FIG. 7) away from the accommodating cavity 11. Therefore, the sink groove 31 is in a flared form, thereby facilitating assembly between the connection portion 41 of the terminal-post cover plate 4 and the sink groove 31, and improving assembly efficiency between the terminal-post cover plate 4 and the terminal-post body 3. In addition, when the sink groove 31 is in the flared form, it is beneficial to implement a design in which the distance between each of the connection portions 41 and the groove wall of the sink groove 31 close to the abutting portion 32 gradually increases in the direction away from the accommodating cavity 11. It should be noted that, when the cross-sectional area of the sink groove 31 gradually increases in the direction away from the accommodating cavity 11, the side groove wall 311 of the sink groove 31 may have a curved surface or an oblique surface, which may be specifically set based on an actual situation.

In some embodiments of the present application, as shown in FIG. 8, the terminal-post cover plate 4 includes a cover plate body 42, each of the connection portions 41 is located at an edge of the cover plate body 42, and a surface of a side of the cover plate body 42 that is away from the accommodating cavity 11 protrudes from a surface of a side of the connection portion 41 that is away from the accommodating cavity 11 (that is, protrudes in a direction away from the accommodating cavity 11). For example, an upper surface of the cover plate body 42 shown in FIG. 8 protrudes upward relative to an upper surface of the connection portion 41. Therefore, an interference impact caused to the assembly of the busbar component 103 because the connection portion 41 protrudes from the cover plate body 42 can be avoided, thereby improving convenience of the assembly of the busbar component 103 and the reliability of the connection between the busbar component 103 and the terminal-post cover plate 4.

For example, when the terminal-post cover plate 4 is connected to the terminal-post body 3 through welding, a sink platform may be disposed at an edge of the cover plate body 42 when the terminal-post cover plate 4 is processed. When a part of the terminal-post cover plate 4 at which the sink platform is disposed is welded to the terminal-post body 3, a reinforcement height generated when the connection portion 41 is formed through welding does not exceed an outer surface of the cover plate body 42, to avoid the interference impact caused to the assembly of the busbar component 103 because the connection portion 41 protrudes from the cover plate body 42, thereby improving the convenience of the assembly of the busbar component 103 and the reliability of the connection between the busbar component 103 and the terminal-post cover plate 4. It should be noted that, a sinking depth of the sink platform is not limited, and may be, for example, approximately 0.2 mm, to ensure a sufficient thickness of the connection portion 41 when a reinforcement height of a welding seam is avoided, thereby improving connection reliability between the terminal-post cover plate 4 and the terminal-post body 3.

In some embodiments of the present application, as shown in FIG. 7, the terminal-post cover plate 4 includes a cover plate body 42, each of the connection portions 41 is located at an edge of the cover plate body 42, and a surface of a side of the cover plate body 42 that is away from the accommodating cavity 11 protrudes, in the direction away from the accommodating cavity 11, from a surface of a side of the abutting portion 32 that is away from the accommodating cavity 11. For example, an upper surface of the cover plate body 42 shown in FIG. 7 protrudes upward relative to an upper surface of the abutting portion 32. Therefore, the abutting portion 32 of the terminal-post body 3 is set to be in a form of being sunk relative to the cover plate body 42, to avoid an interference impact caused to the assembly of the busbar component 103 because the abutting portion 32 protrudes, thereby improving the convenience of the assembly of the busbar component 103 and the reliability of the connection between the busbar component 103 and the terminal-post cover plate 4.

In some embodiments, as shown in FIG. 7 and FIG. 8, the thickness H1 of the abutting portion 32 in the axial direction of the mounting holes 12 is greater than a thickness H2 of each of the connection portions 41 in the axial direction of the mounting holes 12. Therefore, because the thickness of the abutting portion 32 is larger than the thickness of the connection portion 41, deformation of the abutting portion 32 is reduced, thereby further improving the problem that the abutting portion 32 warps due to the connection between the connection portion 41 and the terminal-post body 3.

In some embodiments of the present application, as shown in FIG. 7 and FIG. 8, the thickness H2 of each of the connection portions 41 in the axial direction of the mounting holes 12 ranges from three quarters to five quarters of the depth H3 of the sink groove 31 in the axial direction of the mounting holes 12. That is, H2 ranges from ¾ to 5/4 of H3. Therefore, the thickness H2 of each of the connection portions 41 in the axial direction of the mounting holes 12 is close to the depth H3 of the sink groove 31 in the axial direction of the mounting holes 12, and the connection portion 41 may be roughly accommodated in the sink groove 31, to reduce an interference impact on the assembly of the busbar component 103 caused by the connection portion 41 protruding from an outer surface of the abutting portion 32.

In some embodiments of the present application, when the thickness H2 of each of the connection portions 41 in the axial direction of the mounting holes 12 is less than or equal to the depth H3 of the sink groove 31 in the axial direction of the mounting holes 12, it is beneficial to avoid an interference impact caused to the assembly of the busbar component 103 because the connection portion 41 protrudes. For example, when the connection portion 41 is welded to the terminal-post body 3, it indicates that a depth of the sink groove 31 can avoid a reinforcement height caused when the connection portion 41 is formed, thereby helping avoid the interference impact caused to the assembly of the busbar component 103 because the connection portion 41 protrudes.

Figure 9:
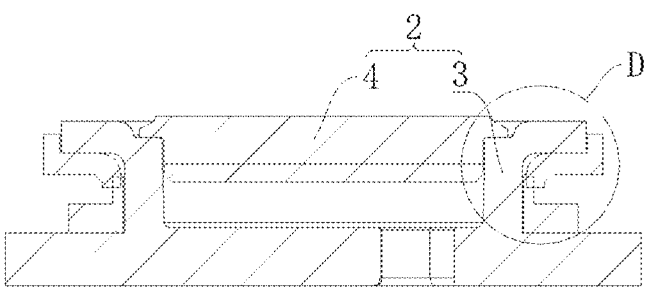
FIG. 9 is a cross-sectional view of assembly of terminal-post bodies, a terminal-post cover plate, and the like according to some embodiments of the present application.
Figure 10:
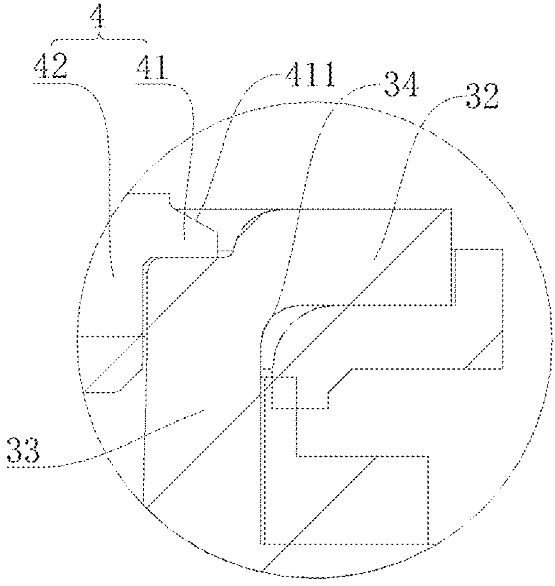
FIG. 10 is a partial enlarged view of a part D circled in FIG. 9.

In some embodiments of the present application, as shown in FIG. 9 and FIG. 10, a surface of the connection portion 41 away from the accommodating cavity 11 intersects with a cross section of the mounting hole 12 at an acute angle. It should be noted that, when the connection portion 41 is connected to the terminal-post body 3 through welding, "a surface of the connection portion 41 away from the accommodating cavity 11 intersects with a cross section of the mounting hole 12 at an acute angle" refers to that, before the connection portion 41 is welded to the terminal-post body 3, the surface of the connection portion 41 away from the accommodating cavity 11 intersects with the cross section of the mounting hole 12 at an acute angle.

Specifically, the surface of the connection portion 41 away from the accommodating cavity 11 is an outer surface 411 of the connection portion 41, and the outer surface 411 of the connection portion 41 intersects with the cross section of the mounting hole 12 at an acute angle. Therefore, the outer surface 411 of the connection portion 41 is not parallel to the cross section of the mounting hole 12, and the outer surface 411 of the connection portion 41 is also not perpendicular to the axial direction of the mounting holes 12. In this way, when the connection portion 41 is welded to the terminal-post body 3 by using laser in a direction parallel to the central axis L of the mounting holes 12, because the outer surface 411 of the connection portion 41 is obliquely disposed as described above, the laser reflected by the outer surface 411 does not return to a laser transmitter in the axial direction of the mounting holes 12, so that a problem that the laser returns and damages the laser transmitter can be improved, thereby protecting the laser transmitter.

For example, when the connection portion 41 of the terminal-post cover plate 4 is of a material of copper, when the connection portion 41 is irradiated by using laser for connection, if an incident path of the laser is perpendicular to a to-be-connected surface, a reflective path of the laser is also perpendicular to the to-be-connected surface, and copper high reflection is easily caused and damages the laser transmitter. In the foregoing embodiment of the present application, the outer surface 411 of the connection portion 41 is set not to be perpendicular to the incident path of the laser, so that the reflective path of the laser deviates from the incident path of the laser, that is, an angle may be formed between the reflective path of the laser and the incident path of the laser, thereby avoiding the problem that the laser transmitter is damaged by the reflected laser.

In some embodiments, as shown in FIG. 10, a surface of each of the connection portions 41 that is away from the accommodating cavity 11 obliquely extends toward a direction approaching the accommodating cavity 11 and in the direction away from the central axis L of the mounting holes 12. Therefore, because a thickness of the connection portion 41 at a position close to the cover plate body 42 is large, and a thickness of the connection portion 41 at a position close to the side groove wall 311 of the sink groove 31 is small, processing and forming of the connection portion 41 of the terminal-post cover plate 4 is facilitated, a material waste is reduced, and costs are reduced. In addition, because the thickness of the connection portion 41 at the position close to the cover plate body 42 is large, and the thickness of the connection portion 41 at the position close to the side groove wall 311 of the sink groove 31 is small, reliability of connecting the terminal-post cover plate 4 and the terminal-post body 3 by the formed connection portion 41 can be improved.

In addition, because a wall thickness of the terminal-post cover plate 4 at the connection portion 41 is reduced, it is beneficial to avoid an interference impact on the assembly of the busbar component 103 caused by connection between the connection portion 41 and the terminal-post body 3. For example, problems such as a reinforcement height formed during welding, an increase in a height during bonding, or a protrusion of the fastener caused when the fastener is disposed may cause the interference impact on the assembly of the busbar component 103. The wall thickness at the connection portion 41 is reduced, so that the foregoing problems can be improved, and assembly smoothness and connection reliability of the busbar component 103 can be improved.

In addition, the surface of each of the connection portions 41 that is away from the accommodating cavity 11 obliquely extends toward the direction approaching the accommodating cavity 11 and in the direction away from the central axis L of the mounting holes 12, so that the outer surface 411 of the connection portion 41 intersects with the cross section of the mounting hole 12 at an acute angle. Therefore, when the connection portion 41 is welded and connected to the terminal-post body 3 through laser, the connection portion 41 is set to the oblique form, so that an angle can be formed between a laser reflection path and a laser incidence path, thereby improving a problem that the laser reflects and damages a laser transmitter, and protecting the laser transmitter.

In addition, it should be noted that, when the outer surface 411 of the connection portion 41 intersects the cross section of the mounting hole 12 at an acute angle, in some embodiments, the outer surface 411 of the connection portion 41 may alternatively be set to obliquely extend toward the direction away from the accommodating cavity 11 and in the direction away from the central axis L of the mounting holes 12.

In some embodiments of the present application, as shown in FIG. 6 and FIG. 7, the terminal-post body 3 includes the penetrating portion 33 penetrating through one of the mounting holes 12, and the abutting portion 32 is connected to the penetrating portion 33 and extends relative to the penetrating portion 33 in the direction away from the central axis L of the mounting holes 12. The battery cell 102 further includes insulating and sealing structures 8 configured to enable the housing 1 and the terminal-post bodies 3 to fit in an insulating and sealing manner. Each of the insulating and sealing structures 8 includes a part disposed between the penetrating portion 33 and the housing 1 and a part disposed between the abutting portion 32 and the housing 1.

Therefore, the terminal-post body 3 is in indirect contact with the housing 1 by disposing the insulating and sealing structure 8, so that a requirement that the connection between the housing 1 and the terminal-post body 3 is insulted and sealed is satisfied. Therefore, the housing 1 or the terminal-post body 3 does not need to be designed as a complex compound structure or the like for insulating and sealing, thereby simplifying designs and processing of the housing 1 and the terminal-post body 3. In addition, because the insulating and sealing structure 8 includes both the part disposed between the penetrating portion 33 and the housing 1 and the part disposed between the abutting portion 32 and the housing 1, disposition stability of the insulating and sealing structure 8 and sufficiency of insulating and sealing can be improved, thereby improving reliability of achieving an insulating and sealing effect by the insulating and sealing structure 8.

It should be noted that the insulating and sealing structure 8 may be one component, or may be formed by a plurality of components. When the insulating and sealing structure 8 is one component, the component may be of a same material, or may be formed by a combination of a plurality of materials. When the insulating and sealing structure 8 is formed by a plurality of components, the plurality of components may be of a same material, or may be of different materials. Any one of the plurality of components may be of a same material, or may be formed by a combination of a plurality of materials, and may be flexibly set. This is not limited herein.

In some embodiments of the present application, as shown in FIG. 7, a first corner 34 disposed toward the housing 1 is provided at a position at which the abutting portion 32 is connected to the penetrating portion 33, a corner of the housing 1 that is disposed close to the first corner 34 is a second corner 131, and each of the insulating and sealing structures 8 includes a third corner 81 disposed corresponding to the first corner 34 and a fourth corner 82 disposed corresponding to the second corner 131. At least one of the first corner 34, the second corner 131, the third corner 81, and the fourth corner 82 is formed as a chamfer. The chamfer may be a rounded chamfer, or an oblique chamfer. This is not limited herein.

Therefore, a right angle is replaced with the chamfer, to increase a force-bearing area or a force-applying area, reduce a local pressure and stress concentration, reduce a cracking risk of the insulating and sealing structure 8 at the third corner 81 or the fourth corner 82 at which the insulating and sealing structure is prone to cracking, improve structural stability of the insulating and sealing structure 8, and further improve the reliability of achieving the insulating and sealing effect by the insulating and sealing structure 8.

For example, when the terminal-post body 3 is assembled and fixed to the housing 1, the first corner 34 easily presses against the third corner 81. As a result, the insulating and sealing structure 8 is cracked at a position of the third corner 81. If the first corner 34 is set to a chamfer, an area of applying a force to the third corner 81 by the first corner 34 can be increased, so that a position of applying the force is dispersed, thereby reducing a risk that the insulating and sealing structure 8 is cracked at the position of the third corner 81 when the applied force concentrates to press against the position of the third corner 81. If the third corner 81 is set to a chamfer, when a force is applied to the third corner 81 by the first corner 34, a force-bearing area of the third corner 81 can be increased, so that the position of applying the force to the third corner 81 is dispersed, thereby reducing a risk that the insulating and sealing structure 8 cracks at the position of the third corner 81.

For example, when the terminal-post body 3 is assembled and fixed to the housing 1, the second corner 131 easily presses against the fourth corner 82. As a result, the insulating and sealing structure 8 is cracked at a position of the fourth corner 82. If the second corner 131 is set to a chamfer, an area of applying a force to the fourth corner 82 by the second corner 131 can be increased, so that a position of applying the force is dispersed, thereby reducing a risk that the insulating and sealing structure 8 is cracked at the position of the fourth corner 82 when the applied force concentrates to press against the position of the fourth corner 82. If the fourth corner 82 is set to a chamfer, when a force is applied to the fourth corner 82 by the second corner 131, a force-bearing area of the fourth corner 82 can be increased, so that the position of applying the force to the fourth corner 82 is dispersed, thereby reducing a risk that the insulating and sealing structure 8 cracks at the position of the fourth corner 82.

It should be noted that, when the insulating and sealing structure 8 is an annular structure surrounding the central axis L of the mounting holes 12, and when the third corner 81 is a chamfer, the third corner 81 may be a chamfer at an entire periphery of the insulating and sealing structure 8, or may be a chamfer at a part of the periphery of the insulating and sealing structure 8, and a remaining position is a right angle. In addition, shapes of chamfers of the third corner 81 at different positions of the periphery of the insulating and sealing structure 8 may be the same or may be different. For example, the third corner 81 is rounded chamfers at some positions at the periphery of the insulating and sealing structure 8, and is oblique chamfers at other positions.

Similarly, when the fourth corner 82 is a chamfer, the fourth corner 82 may be a chamfer at an entire periphery of the insulating and sealing structure 8, or may be a chamfer at a part of the periphery of the insulating and sealing structure 8, and a remaining position is a right angle. In addition, shapes of chamfers of the fourth corner 82 at different positions of the periphery of the insulating and sealing structure 8 may be the same or may be different. For example, the fourth corner 82 is rounded chamfers at some positions at the periphery of the insulating and sealing structure 8, and is oblique chamfers at other positions.

In some embodiments of the present application, as shown in FIG. 7, regardless of whether at least one of the first corner 34 and the third corner 81 is processed into a chamfer, a fitting gap may be provided between the first corner 34 and the third corner 81. In this way, pressing of the first corner 34 against the third corner 81 may also be reduced to some extent, thereby reducing the risk that the insulating and sealing structure 8 is cracked at the position of the third corner 81.

In some embodiments of the present application, as shown in FIG. 7, regardless of whether at least one of the second corner 131 and the fourth corner 82 is processed into a chamfer, a fitting gap may be provided between the second corner 131 and the fourth corner 82. In this way, pressing of the second corner 131 against the fourth corner 82 may also be reduced to some extent, thereby reducing the risk that the insulating and sealing structure 8 is cracked at the position of the fourth corner 82.

In some embodiments of the present application, as shown in FIG. 7, the first corner 34 and the third corner 81 are chamfers having matching shapes. In other words, the first corner 34 and the third corner 81 are both oblique chamfers or rounded chamfers. Therefore, it is convenient to process, make surfaces of the first corner 34 and the third corner 81 contact with each other, or it is beneficial to improve uniformities of the fitting gap between the first corner 34 and the third corner 81, so as to reduce the pressing of the first corner 34 against the third corner 81, thereby reducing the risk that the insulating and sealing structure 8 is cracked at the position of the third corner 81. Certainly, the present application is not limited thereto. For example, alternatively, shapes of the first corner 34 and the third corner 81 do not match.

For example, as shown in FIG. 7, the first corner 34 and the third corner 81 are both rounded chamfers, and a rounded-chamfer radius of the first corner 34 is smaller than a rounded-chamfer radius of the third corner 81, so that, on the premise of improving fitting compactness, the fitting gap between the first corner 34 and the third corner 81 is increased, and the pressing of the first corner 34 against the third corner 81 is reduced, thereby reducing the risk that the insulating and sealing structure 8 is cracked at the position of the third corner 81.

In some embodiments of the present application, as shown in FIG. 7, the second corner 131 and the fourth corner 82 are chamfers having matching shapes. In other words, the second corner 131 and the fourth corner 82 are both oblique chamfers or rounded chamfers. Therefore, it is convenient to process, make surfaces of the second corner 131 and the fourth corner 82 contact with each other, or it is beneficial to improve uniformities of the fitting gap between the second corner 131 and the fourth corner 82, so as to reduce the pressing of the second corner 131 against the third corner 81, thereby reducing the risk that the insulating and sealing structure 8 is cracked at the position of the fourth corner 82. Certainly, the present application is not limited thereto. For example, alternatively, shapes of the second corner 131 and the fourth corner 82 do not match.

For example, as shown in FIG. 7, the third corner 81 and the fourth corner 82 are both chamfers. When the third corner 81 is a rounded chamfer, the fourth corner 82 is an oblique chamfer, so that a wall thickness of the insulating and sealing structure 8 between the third corner 81 and the fourth corner 82 is sufficient, thereby improving reliability of insulating and sealing of the insulating and sealing structure 8. Alternatively, when the fourth corner 82 is set to a rounded chamfer, the third corner 81 is set to an oblique chamfer.

Figure 11:
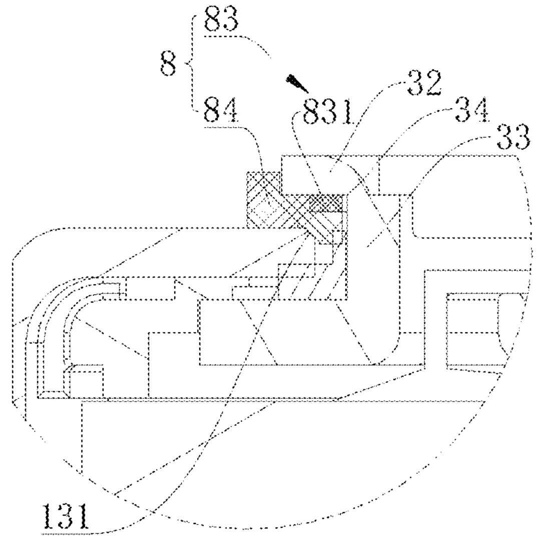
FIG. 11 is a partial cross-sectional view of a battery cell according to some embodiments of the present application.

In some embodiments of the present application, as shown in FIG. 11, the first corner 34 disposed toward the housing 1 is provided at the position at which the abutting portion 32 is connected to the penetrating portion 33, and the corner of the housing 1 that is disposed close to the first corner 34 is the second corner 131. Each of the insulating and sealing structures 8 includes a first part 83 and a second part 84. A material hardness of the first part 83 is less than a material hardness of the second part 84. The first part 83 is disposed closer to at least one of the first corner 34 and the second corner 131 than the second part 84.

Figure 12:
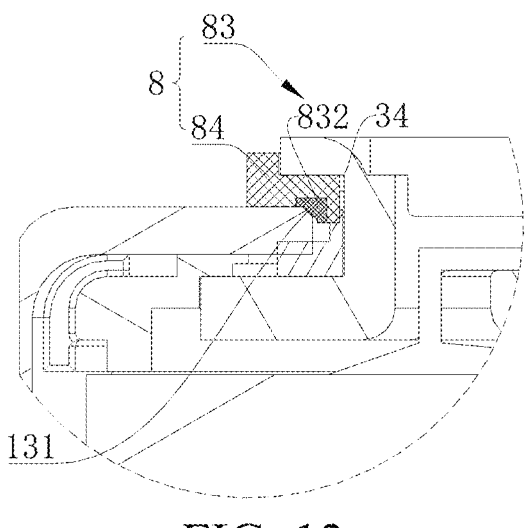
FIG. 12 is a partial cross-sectional view of a battery cell according to some embodiments of the present application.

For example, with reference to FIG. 11 and FIG. 12, the first part 83 may include at least one of a first sub part 831 and a second sub part 832. With reference to FIG. 11, the first sub part 831 is disposed closer to the first corner 34 than the second part 84, and a material hardware of the first sub part 831 is less than a material hardware of the second part 84. With reference to FIG. 12, the second sub part 832 is disposed closer to the second corner 131 than the second part 84, and a material hardware of the second sub part 832 is less than a material hardware of the second part 84.

In this way, when the terminal-post body 3 is assembled and fixed to the housing 1, a position of the insulating and sealing structure 8 corresponding to the first corner 34 is prone to cracking. The first sub part 831 with a small material hardness is set at this position. The first sub part 831 is easily compressed and deformed by a force, and absorbs the force, so that a cracking risk herein can be reduced. Alternatively, a position of the insulating and sealing structure 8 corresponding to the second corner 131 is prone to cracking. The second sub part 832 with a small material hardness is set at this position. The second sub part 832 is easily compressed and deformed by a force, and absorbs the force, so that a cracking risk herein can be reduced.

It should be noted that a material of the first part 83 and a material of the second part 84 are not limited, and may be specifically selected based on an actual requirement. For example, the material of the second part 84 may be selected from an insulating material having a large hardness, such as PPS (that is, polyphenyl sulfide granula, which is a new high-performance thermoplastic resin) or LCP (that is, a liquid crystal polymer), so that the second part 84 has a large hardness and has a supporting function. Therefore, a compression amount of an insulating and sealing material can be well controlled, and a sealing property is improved. The material of the first part 83 may be selected from a compressible rubber material or a plastic material, such as PFA (that is, perfluoroalkoxy alkane), PP (that is, polypropylene), FKM (that is, fluororubber), or EPDM (that is, ethylene propylene diene monomer). Therefore, the first part 83 has good compression and deformation performance, to effectively improve the cracking problem. In addition, when the first part 83 includes both the first sub part 831 and the second sub part 832, the materials of the first sub part 831 and the second sub part 832 may be the same or may be different, and may be specifically set based on an actual situation.

In some embodiments, as shown in FIG. 11, the first part 83 includes a first sub part 831. The first sub part 831 is disposed closer to the first corner 34 than the second part 84. The first sub part 831 defines a part of a surface that is of the insulating and sealing structure 8 and that is on a side facing the abutting portion 32, and/or defines a part of a surface that is of the insulating and sealing structure 8 and that is on a side facing the penetrating portion 33. Therefore, the first sub part 831 is exposed on an outer surface of the insulating and sealing structure 8 at a position close to the first corner 34, so that the first sub part 831 can be better compressed and deformed by the force, which is more beneficial to relieving a cracking problem at the position. In addition, difficulty of combined processing of the first sub part 831 and the second part 84 can be reduced.

Figure 13:
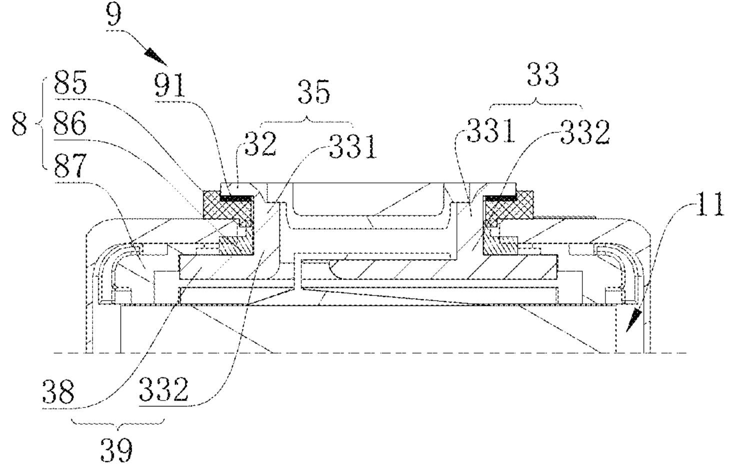
FIG. 13 is a partial cross-sectional view of a battery cell according to some embodiments of the present application.
Figure 14:
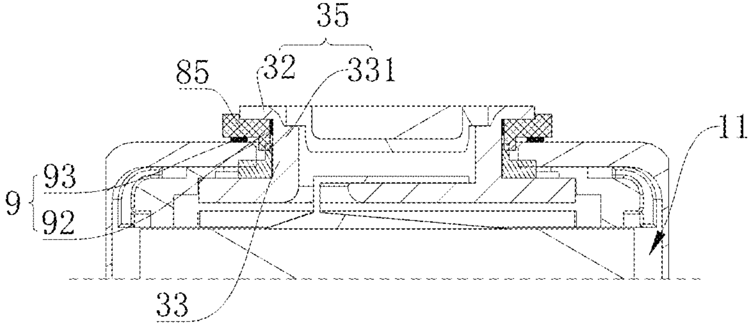
FIG. 14 is a partial cross-sectional view of a battery cell according to some embodiments of the present application.

In some embodiments, as shown in FIG. 13 and FIG. 14, the abutting portion 32 and an end portion (for example, an upper end portion 331 of the penetrating portion 33 shown in FIG. 13) of the penetrating portion 33 that is connected to the abutting portion 32 form a first terminal-post portion 35. Each of the insulating and sealing structures 8 includes a first insulating and sealing member 85 fitted between the first terminal-post portion 35 and the housing 1. A pad 9 configured to buffer a force applied to the first insulating and sealing member 85 by the first terminal-post portion 35 and/or the housing 1 is disposed between the first terminal-post portion 35 and the housing 1. Therefore, by disposing the pad 9, a damage caused to the first insulating and sealing member 85 by an action force applied by the first terminal-post portion 35 to the first insulating and sealing member 85 and/or a reaction force applied by the housing 1 to the first insulating and sealing member 85 can be reduced, thereby protecting the first insulating and sealing member 85 and improving a cracking problem of the first insulating and sealing member 85.

It should be noted that a disposition position of the pad 9 and a buffering manner are not limited, provided that the damage caused to the first insulating and sealing member 85 can be reduced in a process of assembling the terminal-post body 3 to the housing 1. For example, in some embodiments, as shown in FIG. 13 and FIG. 14, the pad 9 may be disposed between the housing 1 and the first insulating and sealing member 85, and/or is disposed between the first terminal-post portion 35 and the first insulating and sealing member 85. In other words, the pad 9 may be disposed between at least one of a position between the housing 1 and the first insulating and sealing member 85 and a position between the first terminal-post portion 35 and the first insulating and sealing member 85. Therefore, assembly of the pad 9 is facilitated, and production difficulty is reduced. In addition, the first insulating and sealing member 85 may be an integral member, thereby facilitating processing and assembly of the first insulating and sealing member 85.

Certainly, the present application is not limited thereto. For example, in another embodiment of the present application, the pad 9 may alternatively be disposed at another position. For example, the first insulating and sealing member 85 is disposed in a form of an assembly. In this case, the pad 9 may be disposed between a plurality of components of the first insulating and sealing member 85, and a material hardness of the pad 9 is set to be less than a material hardness of the first insulating and sealing member 85. When a force generated by assembly of the terminal-post body 3 and the housing 1 is applied to the first insulating and sealing member 85, the pad 9 may be compressed and deformed, to absorb the force, thereby reducing the damage caused to the first insulating and sealing member 85, and protecting the first insulating and sealing member 85.

In some embodiments, referring to FIG. 13, the pad 9 may include a first pad 91, and the first pad 91 is disposed between the abutting portion 32 and the first insulating and sealing member 85. In this case, a material hardness of the first pad 91 and the material hardness of the first insulating and sealing member 85 are not limited. Therefore, when the terminal-post body 3 is mounted to the housing 1, when the abutting portion 32 presses against the first insulating and sealing member 85 in a direction toward the housing 1 (for example, presses against the first insulating and sealing member 85 in the axial direction of the mounting holes 12), because the first pad 91 is disposed between the first insulating and sealing member 85 and the abutting portion 32, the first pad 91 can reduce a part of an action force, thereby reducing an action force conducted to the first insulating and sealing member 85, reducing the damage caused to the first insulating and sealing member 85, and protecting the first insulating and sealing member 85.

In some embodiments, referring to FIG. 14, the pad 9 may include a second pad 92. The second pad 92 is disposed between the penetrating portion 33 and the first insulating and sealing member 85. In this case, a material hardness of the second pad 92 and the material hardness of the first insulating and sealing member 85 are not limited. Therefore, when the terminal-post body 3 is mounted to the housing 1, when the penetrating portion 33 presses against the first insulating and sealing member 85 in the direction toward the housing 1 (for example, presses against the first insulating and sealing member 85 in a radial direction of the mounting holes 12), because the second pad 92 is disposed between the first insulating and sealing member 85 and the penetrating portion 33, the second pad 92 can reduce a part of an action force, thereby reducing an action force conducted to the first insulating and sealing member 85, reducing the damage caused to the first insulating and sealing member 85, and protecting the first insulating and sealing member 85.

In some embodiments, referring to FIG. 14, the pad 9 may include a third pad 93. The third pad 93 is disposed between the first insulating and sealing member 85 and the outer surface of the housing 1, and a material hardware of the third pad 93 is less than the material hardware of the first insulating and sealing member 85. Therefore, when the terminal-post body 3 is mounted to the housing 1, when the terminal-post body 3 presses against the first insulating and sealing member 85 in the direction toward the housing 1 (for example, presses against the first insulating and sealing member 85 in the axial direction of the mounting holes 12), the first insulating and sealing member 85 may conduct a force to the third pad 93. Because the material hardness of the third pad 93 is small, the third pad 93 may be compressed and deformed, and absorb the force, to reduce a reaction force fed back to the first insulating and sealing member 85. In this way, the action force that is applied by the first terminal-post portion 35 to the first insulating and sealing member 85 is buffered, the damage caused to the first insulating and sealing member 85 is reduced, and the first insulating and sealing member 85 is protected.

In some embodiments, the pad 9 may include at least two of the first pad 91, the second pad 92, and the third pad 93, that is, the pad 9 may include any two of the first pad 91, the second pad 92, and the third pad 93, or may include three of the first pad 91, the second pad 92, and the third pad 93, to protect the first insulating and sealing member 85 in a plurality of perspectives, thereby better reducing the damage caused to the first insulating and sealing member 85.

In some embodiments, when the pad 9 includes both the first pad 91 and the second pad 92, the first pad 91 and the second pad 92 may be made into an integral member, thereby helping reduce difficulty in mounting and fixing the second pad 92. In addition, the first pad 91 and the second pad 92 may be mounted together, thereby helping improve overall assembly efficiency.

In some embodiments, when the pad 9 does not include the second pad 92, a fitting gap may be provided between the first insulating and sealing member 85 and the penetrating portion 33. In this way, when the terminal-post body 3 is mounted to the housing 1, when the penetrating portion 33 presses against the first insulating and sealing member 85 in the direction toward the housing 1 (for example, presses against the first insulating and sealing member 85 in the radial direction of the mounting holes 12), because the fitting gap is provided between the first insulating and sealing member 85 and the penetrating portion 33, the penetrating portion 33 does not easily directly press against the first insulating and sealing member 85, thereby reducing the force conducted to the first insulating and sealing member 85, reducing the damage caused to the first insulating and sealing member 85, and protecting the first insulating and sealing member 85.

It should be noted that, in this embodiment of the present application, to protect the first insulating and sealing member 85 from being cracked by a force, at least two measures of setting the chamfer, distinguishing the materials of the first part 83 and the second part 84, and setting the pad 9 may be simultaneously used, to better protect the first insulating and sealing member 85 and improve the problem of being cracked by the force.

It should be noted that a specific composition of the insulating and sealing structure 8 is not limited. For example, in addition to the first insulating and sealing member 85, the insulating and sealing structure 8 may further include another insulating and sealing member. In this way, by combining a plurality of insulating and sealing members, another beneficial technical effect can be considered when insulted and sealed connection between the terminal-post body 3 and the housing 1 is ensured.

For example, in some embodiments, with reference to FIG. 13, the terminal-post body 3 further includes a flange portion 38 abutting inside the housing 1. The flange portion 38 is connected to one end of the penetrating portion 33 close to the accommodating cavity 11. The abutting portion 32 is connected to one end of the penetrating portion 33 away from the accommodating cavity 11. An end portion (for example, a lower end portion 332 of the penetrating portion 33 shown in FIG. 13) of the penetrating portion 33 connected to the flange portion 38 and the flange portion 38 form a second terminal-post portion 39. The insulating and sealing structure 8 includes a second insulating and sealing member 86 fitted between the second terminal-post portion 39 and the housing 1.

For example, the material hardness of the first insulating and sealing member 85 is greater than a material hardness of the second insulating and sealing member 86, and the second insulating and sealing member 86 is more easily compressed and deformed than the first insulating and sealing member 85 and has a better sealing effect. However, a heat resistance capability of the first insulating and sealing member 85 is stronger than that of the second insulating and sealing member 86. For example, the first insulating and sealing member 85 is a plastic member, and the second insulating and sealing member 86 is a rubber member, so that, when the terminal-post body 3 is welded to the terminal-post cover plate 4, a heat impact caused to the second insulating and sealing member 86 can be reduced as much as possible, thereby improving sealing reliability between the housing 1 and the terminal-post body 3. It may be understood that, when the abutting portion 32 warps, an amount of compression performed by the flange portion 38 on the second insulating and sealing member 86 may be insufficient, affecting the sealing reliability.

In addition, in some embodiments, with reference to FIG. 13, the insulating and sealing structure 8 may further include a third insulating and sealing member 87. The third insulating and sealing member 87 may be disposed between the flange portion 38 and the housing 1 and abut against the active-material coating portion 71 of the cell assembly 7, so that not only insulation between the cell assembly 7 and the housing 1 can be improved, but also stability of fitting between the cell assembly 7 and the housing 1 can be improved, thereby further improving the reliability of the battery cell 102. Alternatively, the third insulating and sealing member 87 may be omitted, and an insulating support (which is not shown in the figure) is disposed at an end portion of the active-material coating portion 71. The insulating support abuts against an inner wall of the housing 1, thereby helping protect the cell assembly 7 when the cell assembly 7 is mounted to the housing 1, avoiding scuffing between the housing 1 and the cell assembly 7. In addition, insulation between the cell assembly 7 and the housing 1 can be improved, and the stability of the fitting between the cell assembly 7 and the housing 1 can be improved, thereby improving the reliability of the battery cell 102.

Figure 15:
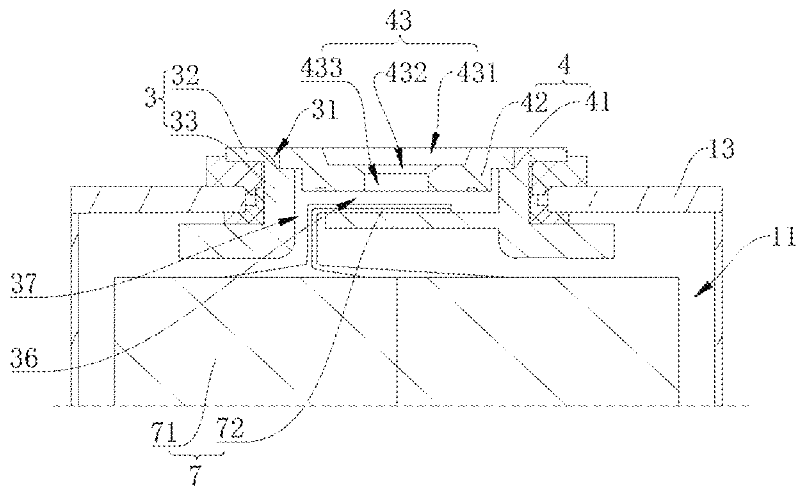
FIG. 15 is a partial cross-sectional view of a battery cell according to some embodiments of the present application.

In some embodiments, as shown in FIG. 15, an accommodating groove 36 open in the direction away from the accommodating cavity 11 is formed on the terminal-post body 3, that is, a notch of the accommodating groove 36 is provided on a surface of the terminal-post body 3 away from the accommodating cavity 11. The sink groove 31 is disposed around the accommodating groove 36 and communicates with the accommodating groove 36. The terminal-post body 3 is provided with a communicating hole 37. The communicating hole 37 penetrates through a groove wall of the accommodating groove 36 that is close to the accommodating cavity 11 and communicates the accommodating cavity 11 with the accommodating groove 36.

Therefore, when an electrolyte solution is injected to the battery cell 102, the electrolyte solution may be injected into the accommodating groove 36, and then flow toward the accommodating cavity 11 through the communicating hole 37. The accommodating groove 36 may buffer the electrolyte solution, to improve problems such as splashing and overflowing of the electrolyte solution. In addition, the side wall of the accommodating groove 36 (that is, a groove wall extending from the notch of the accommodating groove 36 in the direction toward the accommodating cavity 11) may block splashing of the electrolyte solution to some extent, thereby reducing pollution caused by the electrolyte solution to the outside, and facilitating quick liquid injection. In addition, because a liquid injection channel does not need to be separately disposed on the housing 1, special processing does not need to be performed on the housing 1, to help reduce structural complexity and processing difficulty of the housing 1.

For example, as shown in FIG. 15, the terminal-post body 3 includes the penetrating portion 33 penetrating through one of the mounting holes 12, the penetrating portion 33 is annular, and the accommodating groove 36 is located in the inner annular region of the penetrating portion 33. For example, the accommodating groove 36 may be defined by both the penetrating portion 33 and a support portion located in the inner annular region of the penetrating portion 33. When a side of the sink groove 31 close to the central axis L of the mounting holes 12 is open, the sink groove 31 may communicate with the inner annular region of the penetrating portion 33, that is, communicate with the accommodating groove 36. Therefore, when the terminal-post cover plate 4 covers the terminal-post body 3, fitting compactness between the terminal-post cover plate 4 and the terminal-post body 3 can be improved, and the cover plate body 42 of the terminal-post cover plate 4 and the connection portion 41 do not need to be connected by using a bumpy structure, so that the cover plate body 42 can be embedded in the accommodating groove 36, thereby improving fitting compactness between the terminal-post body 3 and the terminal-post cover plate 4, improving connection reliability between the cover plate body 42 of the terminal-post cover plate 4 and the connection portion 41, and simplifying a structure of the terminal-post cover plate 4.

In some embodiments, as shown in FIG. 15, the battery cell 102 includes the cell assembly 7. The cell assembly 7 includes the active-material coating portion 71 accommodated in the accommodating cavity 11 and the conductive portion 72 connected to the active-material coating portion 71. The conductive portion 72 penetrates through the communicating hole 37 to be at least partially accommodated in the accommodating groove 36.

It should be noted that, there may be one or more communicating holes 37, and the conductive portion 72 may penetrate through at least one of the communicating holes 37. For example, an electrolyte solution can pass through at least one of the communicating holes 37. For example, the at least one of the communicating holes 37 is vacant (that is, does not penetrate through the conductive portion 72), so that the electrolyte solution can pass through the communicating hole 37 without being blocked by the conductive portion 72. For another example, the electrolyte solution can still pass through after at least one of the communicating holes 37 penetrates through the conductive portion 72.

Therefore, the conductive portion 72 is at least partially accommodated in the accommodating groove 36, so that the conductive portion 72 at least partially occupies space in the accommodating groove 36, thereby reducing space occupied by the conductive portion 72 in the accommodating cavity 11, and saving space in the accommodating cavity 11 to receive the active-material coating portion 71 with a larger volume, to help improve an energy density of the battery cell 102, or help reduce a size of the battery cell 102 when the energy density of the battery cell 102 remains unchanged.

It may be understood that, the active-material coating portion 71 may include a current collector on which an active material layer is coated, and the conductive portion 72 may include only a tab portion, or may include a tab portion, an adapter electrically connected to the tab portion, and the like. This is not limited herein.

In some embodiments, the conductive portion 72 is welded to the terminal-post body 3 to form electrical connection, so that the cell assembly 7 outputs from an electrode at the terminal-post body 3. For example, as shown in FIG. 15, the conductive portion 72 is welded to a groove wall of the accommodating groove 36 close to the accommodating cavity 11, so that fitting compactness can be improved, and a welding operation thereof can be facilitated. Certainly, the present application is not limited to this. In another embodiment, the conductive portion 72 may alternatively be set to be welded to the terminal-post cover plate 4, to form electrical connection. This is not limited herein.

Figure 16:
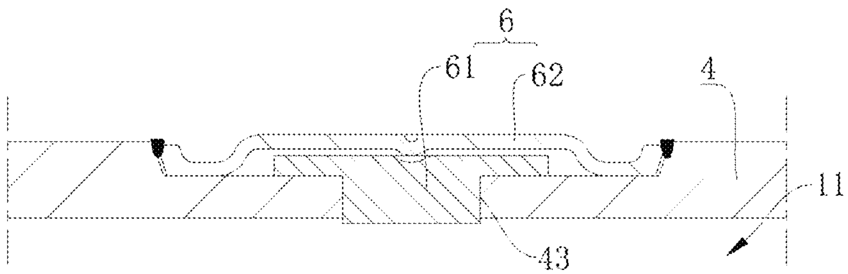
FIG. 16 is a cross-sectional view of assembly of a terminal-post cover plate and a sealing structure according to some embodiments of the present application.

In some embodiments, as shown in FIG. 15 and FIG. 16, a liquid injection hole 43 capable of communicating with the accommodating groove 36 is formed on the terminal-post cover plate 4, and the battery cell 102 further includes a sealing structure 6 configured to seal the liquid injection hole 43. In this way, when an electrolyte solution needs to be injected to the battery cell 102, the sealing structure 6 is not mounted at the liquid injection hole 43 first, or the sealing structure 6 is in a state of opening the liquid injection hole 43. In this case, the electrolyte solution may be injected into the accommodating groove 36 through the liquid injection hole 43. In addition, after the liquid injection, the sealing structure 6 may be mounted at the liquid injection hole 43, or the sealing structure 6 is switched to a state of closing the liquid injection hole 43, so that the liquid injection hole 43 is sealed and closed, to prevent overflowing of the electrolyte solution and prevent an external foreign object from entering the accommodating cavity 11 through the liquid injection hole 43, thereby improving the reliability of the battery cell 102.

Therefore, the liquid injection hole 43 is processed on the terminal-post cover plate 4, and the hole is small and is located outward. Therefore, reliable sealing on a liquid injection entrance can be easily implemented by using the sealing structure 6, working reliability of the battery cell 102 is improved, and a flexible and diversified design of the sealing structure 6 can be implemented.

In some embodiments, as shown in FIG. 15 and FIG. 16, the terminal-post cover plate 4 does not include a part that is blocked at an outer side (that is, a side away from the accommodating cavity 11) of the sealing structure 6, so that the sealing structure 6 is suitable for being mounted to the terminal-post cover plate 4 from an outer side (that is, a side away from the accommodating cavity 11) of the terminal-post cover plate 4. In this way, the sealing structure 6 is set to be mounted to the terminal-post cover plate 4 from the outer side of the terminal-post cover plate 4, to seal the liquid injection hole 43, so that the sealing structure 6 is mounted after liquid injection. Therefore, sealing of the liquid injection hole 43 can be ensured, and a mounting position is close to the outer side, to facilitate quick assembly of the sealing structure 6. Moreover, mounting of the sealing structure 6 does not negatively affect the connection between the terminal-post body 3 and the terminal-post cover plate 4, thereby ensuring the connection reliability between the terminal-post cover plate 4 and the terminal-post body 3.

Figure 17:
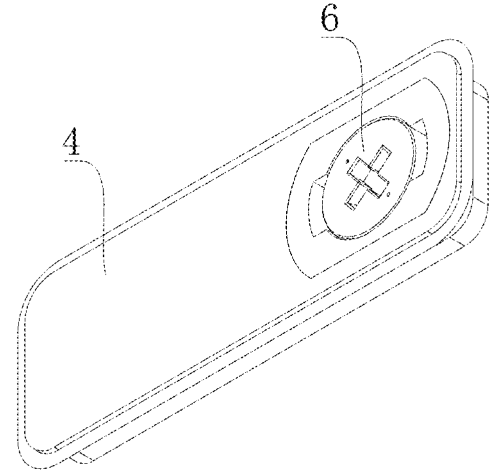
FIG. 17 is a diagram of assembly of a terminal-post cover plate and a sealing structure according to some embodiments of the present application.

The sealing structure 6 may be in a detachable form, or may be in a non-detachable fixed form. For example, as shown in FIG. 17, when the sealing structure 6 is in the detachable form, it is beneficial to maintain the liquid injection hole 43. For example, when an electrolyte solution needs to be supplemented, the sealing structure 6 may be disassembled, the liquid injection hole 43 is opened, the electrolyte solution is supplemented to the accommodating cavity 11 through injection through the liquid injection hole 43, and then the sealing structure 6 is mounted back. For example, the sealing structure 6 may be detachably connected to the terminal-post cover plate 4 by using a thread or through screwing, to facilitate disassembly and assembly. For example, as shown in FIG. 16, when the sealing structure 6 is in the non-detachable fixed form, the sealing structure 6 may be fixed to the terminal-post cover plate 4 through welding, riveting, or the like, thereby improving sealing reliability of the sealing structure 6 to the liquid injection hole 43.

In some embodiments of the present application, as shown in FIG. 16, at least a part of the sealing structure 6 is embedded in the liquid injection hole 43. To be specific, the entire sealing structure 6 may be embedded in the liquid injection hole 43, or only a part of the sealing structure 6 may be embedded in the liquid injection hole 43. Therefore, on one hand, space inside the liquid injection hole 43 can be fully used, thereby improving the sealing reliability of the sealing structure 6 to the liquid injection hole 43; and on the other hand, a height by which the sealing structure 6 protrudes out of the liquid injection hole 43 can be reduced, to reduce occupation of the sealing structure 6 in space outside the terminal-post cover plate 4, thereby helping reduce an interference impact on the busbar component 103, increasing a connection area between the busbar component 103 and the terminal-post cover plate 4, and improving current flowing efficiency.

In some embodiments of the present application, as shown in FIG. 15 and FIG. 16, the sealing structure 6 includes both a first sealing member 61 and a second sealing member 62. At least a part of the first sealing member 61 is embedded in the liquid injection hole 43 and is in interference fit with the liquid injection hole 43 to seal the liquid injection hole 43. The second sealing member 62 is located on a side of the first sealing member 61 away from the accommodating cavity 11, and an edge of the second sealing member 62 is in welding and sealing fit with the terminal-post cover plate 4. Therefore, the first sealing member 61 can effectively seal the liquid injection hole 43. The second sealing member 62 not only can seal the liquid injection hole 43, but also can prevent the first sealing member 61 from falling out of the liquid injection hole 43, thereby improving the sealing reliability of the sealing structure 6 to the liquid injection hole 43.

For example, the first sealing member 61 may be a material such as plastic or rubber, to facilitate the interference fit and improve a sealing effect. For example, the second sealing member 62 may be a metal material that is the same as a material of the terminal-post cover plate 4, for example, may be an aluminum material, thereby helping improve a yield rate of welding between the second sealing member 62 and the terminal-post cover plate 4. In addition, it should be noted that a manner of welding the second sealing member 62 to the terminal-post cover plate 4 is not limited. For example, fusion welding or braze welding may be used. For example, welding may be performed by using pulse laser, to improve manufacturing efficiency and an automation degree.

It should be noted that laser welding has a high requirement on cleanliness of the liquid injection hole 43. If the liquid injection hole 43 has a residual electrolyte solution, the electrolyte solution is easily heated and gasified, and waste gas generated by the gasification may rush out a welding molten pool, causing defects such as a pinhole and an explosion point that are generated at a welding position. In some embodiments of the present application, with reference to FIG. 15, the liquid injection hole 43 includes a first hole section 431, a second hole section 432, and a third hole section 433 that are sequentially disposed along a liquid injection flow direction. An overflow area of the first hole section 431 gradually decreases along a direction from the first hole section 431 to the second hole section 432. An overflow area of an outlet end of the first hole section 431 is greater than or equal to an overflow area of an entrance end of the second hole section 432. An overflow area of the second hole section 432 gradually decreases along a direction from the second hole section 432 to the third hole section 433. An overflow area of an outlet end of the second hole section 432 is equal to an overflow area of an entrance end of the third hole section 433. The third hole section 433 is a hole section with equal cross sections, and the first sealing member 61 is in interference fit with the third hole section 433. Therefore, a problem of liquid accumulation in the first hole section 431 and the second hole section 432 of the liquid injection hole 43 can be improved, thereby helping improve the yield rate of the welding between the second sealing member 62 and the terminal-post cover plate 4, and improving sealing. Certainly, the present application is not limited thereto. For example, in another embodiment of the present application, the third hole section 433 may alternatively be omitted in the liquid injection hole 43, and only the first hole section 431 and the second hole section 432 are included.

Alternatively, in some embodiments, the second sealing member 62 may be set to be detachably connected to the terminal-post cover plate 4 through screwing, to limit the first sealing member 61 to be at a position in which the first sealing member 61 is in interference fit with the liquid injection hole 43.

In some embodiments of the present application, as shown in FIG. 15, the housing 1 includes a first housing wall 13, the mounting hole 12 is formed on the first housing wall 13, and the first housing wall 13 is an integrally formed cover plate. Alternatively, as shown in FIG. 6, the housing 1 further includes a second housing wall 14, the first housing wall 13 is integrally formed with at least one second housing wall 14, and the second housing wall 14 extends toward a side in a thickness direction of the first housing wall 13. Therefore, a flexible design of a structural position of the terminal post 2 can be implemented, thereby increasing an applicable scope of the battery cell 102 in this embodiment of the present application.

It should be noted that the second housing wall 14 may extend out from an edge of the first housing wall 13. When the first housing wall 13 is rectangular, at least one of four edges of the first housing wall 13 may extend out of the second housing wall 14. For example, only one edge of the first housing wall 13 extends out of the second housing wall 14, only two edges of the first housing wall 13 respectively extend out of the second housing wall 14, three edges of the first housing wall 13 respectively extend out of the second housing wall 14, or all the four edges of the first housing wall 13 extend out of the second housing wall 14. For example, when the housing 1 is a rectangular housing, any wall of the rectangular housing may be used as the first housing wall 13.

For example, the housing 1 may include a housing body and a cover plate. The housing body defines space that is open on one side, and the cover plate is disposed on the open side of the housing body to form the accommodating cavity 11 between the housing body and the cover plate. In this case, a wall surface of the housing body opposite to the cover plate is the first housing wall 13, and a wall surface of the housing body connected between the first housing wall 13 and the cover plate is the second housing wall 14. Alternatively, a wall surface of the housing body opposite to the cover plate is the second housing wall 14, and a wall surface of the housing body connected between the second housing wall 14 and the cover plate is the first housing wall 13. Alternatively, the cover plate is the first housing wall 13.

According to an embodiment of a second aspect of the present application, a battery cell 102 is provided. The battery cell 102 may include a housing 1, terminal-post bodies 3, and a terminal-post cover plate 4. The housing 1 is provided with mounting holes 12, where an accommodating cavity 11 is defined in the housing 1. The terminal-post body 3 includes a penetrating portion 33 penetrating through one of the mounting holes 12 and an abutting portion 32 abutting outside the housing 1. The abutting portion 32 is connected to the penetrating portion 33 and extends relative to the penetrating portion 33 in a direction away from a central axis L of the mounting holes 12. A sink groove 31 open in a direction away from the accommodating cavity 11 is formed between the abutting portion 32 and the penetrating portion 33. The terminal-post cover plate 4 covers the terminal-post bodies 3. An edge of the terminal-post cover plate 4 is disposed in the sink groove 31, and welded to the penetrating portion 33 in a penetrating manner. A welding structure 5 formed through the welding is separated from the abutting portion 32.

For example, the connection portion 41 is disposed at the edge of the terminal-post cover plate 4, and the connection portion 41 is welded to the terminal-post body 3 to form the welding structure 5. When the welding structure 5 is formed, a shrinking stress generated by solidification of a molten pool may be blocked by an interval position, and is hardly or rarely conducted to the abutting portion 32, so that a problem that the abutting portion 32 wraps can be improved.

It should be noted that, when there is no contradiction, the embodiment in the first aspect of the present application may be combined with the embodiment in the second aspect of the present application. For example, in the embodiment in the second aspect of the present application, reference may be made to the following technical solutions, and for technical effects of the following technical solutions, reference may be made to the descriptions of the embodiment in the first aspect. Therefore, details are not described again.

For example, in some embodiments, the penetrating portion 33 is annular, and a maximum radial width of the welding structure 5 is less than a radial wall thickness D1 of the penetrating portion 33.

For example, in some embodiments, a depth H3 of the sink groove 31 in an axial direction of the mounting holes 12 ranges from one third to two thirds of a thickness H1 of the abutting portion 32 in the axial direction of the mounting holes 12.

For example, in some embodiments, the penetrating portion 33 is annular, and a side of the sink groove 31 close to the central axis L of the mounting holes 12 is open, to communicate with an inner annular region of the penetrating portion 33.

For example, in some embodiments, the abutting portion 32 includes a first section 321 and a second section 322 that are sequentially disposed in a direction away from the penetrating portion 33. When a surface perpendicular to the axial direction of the mounting holes 12 is used as a projection surface and the axial direction of the mounting holes 12 is used as a projection direction, a projection of the first section 321 on the projection surface is located inside a projection of one of the mounting holes 12 on the projection surface, and a projection of the second section 322 on the projection surface is located outside the projection of the mounting hole 12 on the projection surface.

For example, in some embodiments, the abutting portion 32 is formed on the terminal-post body 3 through flange riveting.

For example, in some embodiments, a distance between the welding structure 5 and the abutting portion 32 gradually increases in a direction away from the accommodating cavity 11.

For example, in some embodiments, a cross-sectional area of the sink groove 31 gradually increases in the direction away from the accommodating cavity 11.

For example, in some embodiments, the terminal-post cover plate 4 includes a cover plate body 42, a connection portion 41 is disposed at an edge of the cover plate body 42, and the connection portion 41 is welded to the terminal-post body 3 to form the welding structure 5. Before the welding, a surface of the cover plate body 42 away from the accommodating cavity 11 protrudes, in a direction away from the accommodating cavity 11, from a surface of the connection portion 41 away from the accommodating cavity 11.

For example, in some embodiments, the thickness H1 of the abutting portion 32 in the axial direction of the mounting holes 12 is greater than a thickness of the welding structure 5 in the axial direction of the mounting holes 12.

For example, in some embodiments, the thickness of the welding structure 5 in the axial direction of the mounting holes 12 ranges from three quarters to five quarters of the depth H3 of the sink groove 31 in the axial direction of the mounting holes 12.

For example, in some embodiments, the terminal-post cover plate 4 includes a cover plate body 42, a connection portion 41 is disposed at an edge of the cover plate body 42, and the connection portion 41 is welded to the terminal-post body 3 to form the welding structure 5. Before the welding, a surface of the connection portion 41 away from the accommodating cavity 11 obliquely extends toward a direction approaching the accommodating cavity 11 and in a direction away from the central axis L of the mounting holes 12.

For example, in some embodiments, the battery cell 102 further includes insulating and sealing structures 8 configured to enable the housing 1 and the terminal-post bodies 3 to fit in an insulating and sealing manner. Each of the insulating and sealing structures 8 includes a part disposed between the penetrating portion 33 and the housing 1 and a part disposed between the abutting portion 32 and the housing 1.

For example, in some embodiments, a first corner 34 disposed toward the housing 1 is provided at a position at which the abutting portion 32 is connected to the penetrating portion 33, a corner of the housing 1 that is disposed close to the first corner 34 is a second corner 131, and each of the insulating and sealing structures 8 includes a third corner 81 disposed corresponding to the first corner 34 and a fourth corner 82 disposed corresponding to the second corner 131. At least one of the first corner 34, the second corner 131, the third corner 81, and the fourth corner 82 is formed as a chamfer.

For example, in some embodiments, the first corner 34 disposed toward the housing 1 is provided at the position at which the abutting portion 32 is connected to the penetrating portion 33, and the corner of the housing 1 that is disposed close to the first corner 34 is the second corner 131. Each of the insulating and sealing structures 8 includes the third corner 81 disposed corresponding to the first corner 34 and the fourth corner 82 disposed corresponding to the second corner 131. There is a fitting gap between the first corner 34 and the third corner 81, and/or there is a fitting gap between the second corner 131 and the fourth corner 82.

For example, in some embodiments, the first corner 34 disposed toward the housing 1 is provided at the position at which the abutting portion 32 is connected to the penetrating portion 33, and the corner of the housing 1 that is disposed close to the first corner 34 is the second corner 131. Each of the insulating and sealing structures 8 includes a first part 83 and a second part 84. A material hardness of the first part 83 is less than a material hardness of the second part 84. The first part 83 is disposed closer to at least one of the first corner 34 and the second corner 131 than the second part 84.

For example, in some embodiments, the first part 83 includes a first sub part 831. The first sub part 831 is disposed closer to the first corner 34 than the second part 84. The first sub part 831 defines a part of a surface that is of the insulating and sealing structure 8 and that is on a side facing the abutting portion 32, and/or defines a part of a surface that is of the insulating and sealing structure 8 and that is on a side facing the penetrating portion 33.

For example, in some embodiments, the abutting portion 32 and an end portion of the penetrating portion 33 that is connected to the abutting portion 32 form a first terminal-post portion 35. Each of the insulating and sealing structures 8 includes a first insulating and sealing member 85 fitted between the first terminal-post portion 35 and the housing 1. A pad 9 configured to buffer a force applied to the first insulating and sealing member 85 by the first terminal-post portion 35 is disposed between the first terminal-post portion 35 and the housing 1.

For example, in some embodiments, the pad 9 is disposed between the housing 1 and the first insulating and sealing member 85, and/or is disposed between the first terminal-post portion 35 and the first insulating and sealing member 85.

For example, in some embodiments, the pad 9 includes at least one of a first pad 91, a second pad 92, and a third pad 93. The first pad 91 is disposed between the abutting portion 32 and the first insulating and sealing member 85, the second pad 92 is disposed between the penetrating portion 33 and the first insulating and sealing member 85, the third pad 93 is disposed between the first insulating and sealing member 85 and the housing 1, and a material hardness of the third pad 93 is less than a material hardness of the first insulating and sealing member 85.

For example, in some embodiments, an accommodating groove 36 open in the direction away from the accommodating cavity 11 is formed on the terminal-post body 3. The sink groove 31 is disposed around the accommodating groove 36 and communicates with the accommodating groove 36. The terminal-post body 3 is provided with a communicating hole 37. The communicating hole 37 penetrates through a groove wall of the accommodating groove 36 that is close to the accommodating cavity 11 and communicates the accommodating cavity 11 with the accommodating groove 36.

For example, in some embodiments, the battery cell 102 includes the cell assembly 7. The cell assembly 7 includes the active-material coating portion 71 accommodated in the accommodating cavity 11 and the conductive portion 72 connected to the active-material coating portion 71. The conductive portion 72 penetrates through the communicating hole 37 to be at least partially accommodated in the accommodating groove 36.

For example, in some embodiments, a liquid injection hole 43 capable of communicating with the accommodating groove 36 is formed on the terminal-post cover plate 4, and the battery cell 102 further includes a sealing structure 6 configured to seal the liquid injection hole 43.

Figure 18:
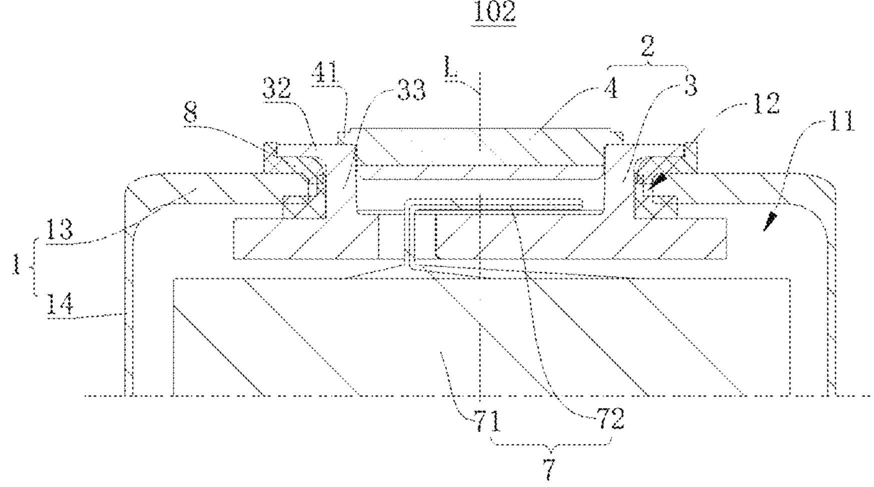
FIG. 18 is a partial cross-sectional view of a battery cell according to some embodiments of the present application.

According to an embodiment of a third aspect of the present application, a battery cell 102 is provided. With reference to FIG. 18, the battery cell 102 includes a housing 1, terminal-post bodies 3, and a terminal-post cover plate 4. The housing 1 is provided with mounting holes 12. The terminal-post body 3 penetrates through one of the mounting holes 12, and includes an abutting portion 32 abutting outside the housing 1. The terminal-post cover plate 4 covers the terminal-post bodies 3, and includes connection portions 41 connected to the terminal-post bodies 3. When a surface perpendicular to an axial direction of the mounting holes 12 is used as a projection surface and the axial direction of the mounting holes 12 is used as a projection direction, a projection of a part of the abutting portion 32 that abuts against the housing 1 on the projection surface is separated from a projection of one of the connection portions 41 on the projection surface.

It should be noted that the part of the abutting portion 32 that abuts against the housing 1 is a part of the abutting portion 32 that is in direct or indirect contact with the housing 1. For example, the housing 1 includes a first housing wall 13, the mounting holes 12 are formed on the first housing wall 13. When an axial direction of the mounting holes 12 is used as a projection direction and a surface perpendicular to the axial direction of the mounting holes 12 is used as a projection surface, there is an overlapping region between a projection of the abutting portion 32 on the projection surface and a projection of the first housing wall 13 on the projection surface, and a part of the abutting portion 32 that corresponds to the overlapping region is in direct or indirect contact with the housing 1, that is, the part of the abutting portion 32 that abuts against the housing 1.

It can be seen that, in the embodiment in the third aspect of the present application, in comparison with the embodiment in the first aspect and the embodiment in the second aspect, the terminal-post body 3 may not be provided with the sink groove 31. The projection of the part of the abutting portion 32 that abuts against the housing 1 on the projection surface is set to be separated from the projection of the connection portion 41 on the projection surface, so that conduction of an action force generated by the connection between the connection portion 41 and the terminal-post body 3 to the part of the abutting portion 32 that abuts against the housing 1 can be reduced, thereby improving a problem that the part of the abutting portion 32 that abuts against the housing 1 warps.

It should be noted that, when the sink groove 31 is not considered and there is no contradiction, the embodiment in the first aspect of the present application may be combined with the embodiment in the third aspect of the present application. For example, in the embodiment in the third aspect of the present application, reference may be made to the following technical solutions, and for technical effects of the following technical solutions, reference may be made to the descriptions of the embodiment in the first aspect. Therefore, details are not described again.

For example, in some embodiments, the terminal-post body 3 includes a penetrating portion 33 penetrating through one of the mounting holes 12, and the abutting portion 32 is connected to the penetrating portion 33 and extends relative to the penetrating portion 33 in a direction away from the central axis L of the mounting holes 12. A part of a projection of the abutting portion 32 on the projection surface is located within a projection range of the mounting holes 12 on the projection surface. Therefore, a remaining part of the projection of the abutting portion 32 on the projection surface is located outside the projection range of the mounting holes 12 on the projection surface, to abut against the housing 1. The projection of the connection portion 41 on the projection surface is located within a projection range of the penetrating portion 33 on the projection surface. The connection portion 41 is disposed on the penetrating portion 33 and connected to the penetrating portion 33. Therefore, the connection portion 41 may be further away from the part of the abutting portion 32 that abuts against the housing 1, to further improve a problem that the part of the abutting portion 32 that abuts against the housing 1 warps.

For example, in some embodiments, the connection portion 41 is welded to the penetrating portion 33. Alternatively, in another embodiment, the connection portion 41 and the penetrating portion 33 may be connected by through bonding, by using a fastener, or the like.

For example, in some embodiments, the connection portion 41 is formed at an edge of the terminal-post cover plate 4.

For example, in some embodiments, the penetrating portion 33 is annular, and a radial width D2 by which each of the connection portions 41 covers one of the terminal-post bodies 3 is less than a radial wall thickness D1 of the penetrating portion 33.

For example, in some embodiments, the abutting portion 32 is formed on the terminal-post body 3 through flange riveting.

For example, in some embodiments, the terminal-post cover plate 4 includes a cover plate body 42, each of the connection portions 41 is located at an edge of the cover plate body 42, and a surface of a side of the cover plate body 42 that is away from the accommodating cavity 11 protrudes, in a direction away from the accommodating cavity 11, from a surface of a side of the connection portion 41 that is away from the accommodating cavity 11.

For example, in some embodiments, a surface of each of the connection portions 41 that is away from the accommodating cavity 11 obliquely extends toward a direction approaching the accommodating cavity 11 and in the direction away from the central axis L of the mounting holes 12.

For example, in some embodiments, the battery cell 102 further includes insulating and sealing structures 8 configured to enable the housing 1 and the terminal-post bodies 3 to fit in an insulating and sealing manner. Each of the insulating and sealing structures 8 includes a part disposed between the penetrating portion 33 and the housing 1 and a part disposed between the abutting portion 32 and the housing 1.

For example, in some embodiments, a first corner 34 disposed toward the housing 1 is provided at a position at which the abutting portion 32 is connected to the penetrating portion 33, a corner of the housing 1 that is disposed close to the first corner 34 is a second corner 131, and each of the insulating and sealing structures 8 includes a third corner 81 disposed corresponding to the first corner 34 and a fourth corner 82 disposed corresponding to the second corner 131. At least one of the first corner 34, the second corner 131, the third corner 81, and the fourth corner 82 is formed as a chamfer.

For example, in some embodiments, the first corner 34 disposed toward the housing 1 is provided at the position at which the abutting portion 32 is connected to the penetrating portion 33, and the corner of the housing 1 that is disposed close to the first corner 34 is the second corner 131. Each of the insulating and sealing structures 8 includes the third corner 81 disposed corresponding to the first corner 34 and the fourth corner 82 disposed corresponding to the second corner 131. There is a fitting gap between the first corner 34 and the third corner 81, and/or there is a fitting gap between the second corner 131 and the fourth corner 82.

For example, in some embodiments, the first corner 34 disposed toward the housing 1 is provided at the position at which the abutting portion 32 is connected to the penetrating portion 33, and the corner of the housing 1 that is disposed close to the first corner 34 is the second corner 131. Each of the insulating and sealing structures 8 includes a first part 83 and a second part 84. A material hardness of the first part 83 is less than a material hardness of the second part 84. The first part 83 is disposed closer to at least one of the first corner 34 and the second corner 131 than the second part 84.

For example, in some embodiments, the first part 83 includes a first sub part 831. The first sub part 831 is disposed closer to the first corner 34 than the second part 84. The first sub part 831 defines a part of a surface that is of the insulating and sealing structure 8 and that is on a side facing the abutting portion 32, and/or defines a part of a surface that is of the insulating and sealing structure 8 and that is on a side facing the penetrating portion 33.

For example, in some embodiments, the abutting portion 32 and an end portion of the penetrating portion 33 that is connected to the abutting portion 32 form a first terminal-post portion 35. Each of the insulating and sealing structures 8 includes a first insulating and sealing member 85 fitted between the first terminal-post portion 35 and the housing 1. A pad 9 configured to buffer a force applied to the first insulating and sealing member 85 by the first terminal-post portion 35 is disposed between the first terminal-post portion 35 and the housing 1.

For example, in some embodiments, the pad 9 is disposed between the housing 1 and the first insulating and sealing member 85, and/or is disposed between the first terminal-post portion 35 and the first insulating and sealing member 85.

For example, in some embodiments, the pad 9 includes at least one of a first pad 91, a second pad 92, and a third pad 93. The first pad 91 is disposed between the abutting portion 32 and the first insulating and sealing member 85, the second pad 92 is disposed between the penetrating portion 33 and the first insulating and sealing member 85, the third pad 93 is disposed between the first insulating and sealing member 85 and the housing 1, and a material hardness of the third pad 93 is less than a material hardness of the first insulating and sealing member 85.

For example, in some embodiments, an accommodating groove 36 open in the direction away from the accommodating cavity 11 is formed on the terminal-post body 3. The abutting portion 32 is disposed around the accommodating groove 36. The terminal-post body 3 is provided with a communicating hole 37. The communicating hole 37 penetrates through a groove wall of the accommodating groove 36 that is close to the accommodating cavity 11 and communicates the accommodating cavity 11 with the accommodating groove 36.

For example, in some embodiments, the battery cell 102 includes the cell assembly 7. The cell assembly 7 includes the active-material coating portion 71 accommodated in the accommodating cavity 11 and the conductive portion 72 connected to the active-material coating portion 71. The conductive portion 72 penetrates through the communicating hole 37 to be at least partially accommodated in the accommodating groove 36.

For example, in some embodiments, a liquid injection hole 43 capable of communicating with the accommodating groove 36 is formed on the terminal-post cover plate 4, and the battery cell 102 further includes a sealing structure 6 configured to seal the liquid injection hole 43.

According to an embodiment of a fourth aspect of the present application, an embodiment of the present application further provides a battery 100, including the battery cell 102 in any one of the foregoing solutions. It should be noted that the battery 100 in this embodiment of the present application may include or may not include a box body. Therefore, because reliability of the battery cell 102 in this embodiment of the present application is improved, performance of the battery 100 is improved.

Figure 19:
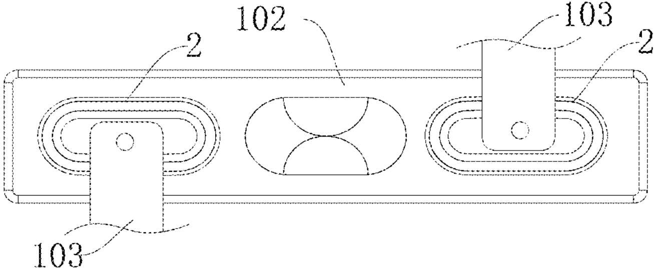
FIG. 19 is a schematic diagram of fitting between a battery cell and a busbar component according to some embodiments of the present application.

For example, as shown in FIG. 19, the battery 100 may further include a busbar component 103. There are a plurality of battery cells 102, and at least two thereof are electrically connected by using the busbar component 103. Therefore, the plurality of battery cells 102 may be connected in series and/or connected in parallel. For example, when the plurality of battery cells 102 are connected in series, a terminal-post cover plate 4 of an anode of one battery cell 102 is connected to a terminal-post cover plate 4 of a cathode of a next battery cell 102 by using one busbar component 103. In this case, a terminal-post cover plate 4 of a cathode of the battery cell 102 is connected to a terminal-post cover plate 4 of an anode of a previous battery cell 102 by using another busbar component 103.

According to an embodiment of a fifth aspect of the present application, an embodiment of the present application further provides a power consuming apparatus, including the battery 100 in any one of the foregoing solutions, and the battery 100 is configured to provide power for the power consuming apparatus. The power consuming apparatus may be any one of the foregoing devices or systems to which the battery 100 is applied. Because performance of the battery 100 is improved, it is beneficial to improve working power consuming performance of the power consuming apparatus.

A battery cell 102 of a specific embodiment of the present application is described below.

Referring to FIG. 3 to FIG. 8, the battery cell 102 includes a housing 1, terminal-post bodies 3, a terminal-post cover plate 4, and a cell assembly 7. The housing 1 is provided with mounting holes 12, where an accommodating cavity 11 is defined in the housing 1. The terminal-post body 3 penetrates through one of the mounting holes 12, and includes a penetrating portion 33 penetrating through one of the mounting holes 12 and an abutting portion 32 abutting outside the housing 1. The abutting portion 32 is connected to the penetrating portion 33 and extends relative to the penetrating portion 33 in a direction away from the central axis L of the mounting holes 12, and the abutting portion 32 protrudes from the penetrating portion 33 in a direction away from the accommodating cavity 11, to define the sink groove 31 between a surface of the abutting portion 32 that is close to the central axis L of the mounting holes 12 and a surface of the penetrating portion 33 that is away from the accommodating cavity 11. An insulating and sealing structure 8 is provided between the housing 1 and the terminal-post body 3, and the insulating and sealing structure 8 is configured to enable the housing 1 and the terminal-post bodies 3 to fit in an insulating and sealing manner.

Referring to FIG. 3 to FIG. 8, the terminal-post cover plate 4 covers the terminal-post body 3, and the terminal-post cover plate 4 includes a cover plate body 42 and a connection portion 41. The connection portion 41 is located at an edge of the cover plate body 42. The connection portion 41 is disposed on the penetrating portion 33 and is connected to the penetrating portion 33 through welding. After the welding, the connection portion 41 may be formed into a solidified structure formed by solidifying a molten pool. The solidified structure is separated from a groove wall of the sink groove 31 close to the abutting portion 32.

In this embodiment of the present application, the connection portion 41 is welded to the penetrating portion 33, and after the connection portion 41 is formed as the molten pool and is solidified, the connection portion 41 is separated from the abutting portion 32, so that the shrinking stress generated due to the solidification of the molten pool can be blocked, and is hardly or rarely conducted to the abutting portion 32. Therefore, a problem that the abutting portion 32 wraps can be improved, and reliability of abutting against the housing 1 by the abutting portion 32 can be improved. A compression amount of the insulating and sealing structure 8 satisfies a requirement, and sealing between the terminal-post body 3 and the housing 1 can be improved, thereby effectively improving connection reliability and sealing strictness between the terminal-post body 3 and the housing 1. Therefore, reliability of the battery cell 102 can be improved.

In addition, the problem that the abutting portion 32 warps can be improved, so that it is beneficial to improve a problem that assembly and connection of a busbar component 103 are affected because the abutting portion 32 warps, and improve smoothness and reliability of connection between the busbar component 103 and the terminal-post cover plate 4. In addition, the connection portion 41 of the terminal-post cover plate 4 that is connected to the terminal-post body 3 is separated from the groove wall of the sink groove 31 close to the abutting portion 32, so that a requirement on an assembly gap between the terminal-post cover plate 4 and the terminal-post body 3 can be reduced, a requirement on processing precision of the terminal-post cover plate 4 can be reduced, and compatibility of the terminal-post body 3 can be increased.

Referring to FIG. 3 to FIG. 8, the penetrating portion 33 is annular, and the accommodating groove 36 is located in an inner annular region of the penetrating portion 33. A side of the sink groove 31 close to the central axis L of the mounting holes 12 is open to communicate with the accommodating groove 36. The terminal-post body 3 is provided with a communicating hole 37. The communicating hole 37 penetrates through a groove wall of the accommodating groove 36 that is close to the accommodating cavity 11 and communicates the accommodating cavity 11 with the accommodating groove 36. The cell assembly 7 includes an active-material coating portion 71 and an conductive portion 72, the active-material coating portion 71 is accommodated in the accommodating cavity 11, the conductive portion 72 connects the active-material coating portion 71 to the terminal-post body 3, the conductive portion 72 penetrates through the communicating hole 37 to be at least partially accommodated in the accommodating groove 36, and a part of the conductive portion 72 located in the accommodating groove 36 is connected to the terminal-post body 3.

Therefore, the conductive portion 72 is at least partially accommodated in the accommodating groove 36, so that the conductive portion 72 at least partially occupies space in the accommodating groove 36, thereby reducing space occupied by the conductive portion 72 in the accommodating cavity 11, and saving space in the accommodating cavity 11 to receive the active-material coating portion 71 with a larger volume, to help improve an energy density of the battery cell 102, or help reduce a size of the battery cell 102 when the energy density of the battery cell 102 remains unchanged.

It should be noted that the embodiments and features of embodiments of the present application may be combined with each other without conflict.

The foregoing descriptions are only preferred embodiments of the present application and are not intended to limit the present application. For a person skilled in the art, the present application may have various modifications and changes. Any modification, equivalent replacement, and improvement made within the spirit and principle of the present application are included in the protection scope of the present application.

What is claimed is:

1. A battery cell, comprising:

a housing, provided with a mounting hole, wherein an accommodating cavity is defined in the housing;

a terminal-post body, wherein the terminal-post body penetrates through the mounting hole, the terminal-post body comprises an abutting portion abutting outside the housing, a sink groove is provided at an end portion of the terminal-post body away from the accommodating cavity, the sink groove is hollowed in a direction toward the accommodating cavity and is open in a direction away from the accommodating cavity, a notch of the sink groove is located on a surface of the terminal-post body on a side away from the accommodating cavity, and the sink groove is disposed closer to a central axis of the mounting hole than an edge of the abutting portion; and a terminal-post cover plate, covering the terminal-post body, and comprising a connection portion connected to the terminal-post body, wherein the connection portion is disposed at the sink groove and connected to a part of the terminal-post body located at the sink groove and close to a side of the accommodating cavity, the connection portion is separated from a side groove wall of the sink groove close to the abutting portion, the side groove wall is a side surface of the sink groove close to the abutting portion, a separation space S is provided between the connection portion and the side groove wall of the sink groove.

2. The battery cell according to claim 1, wherein the connection portion is welded to the part of one of the terminal-post body located at the sink groove and close to the side of the accommodating cavity, a surface of the connection portion away from the accommodating cavity is an outer surface of the connection portion, and the outer surface of the connection portion intersects with a cross section of the mounting hole at an acute angle.

3. The battery cell according to claim 1, wherein the terminal-post body comprises a penetrating portion penetrating through the mounting hole, and at least a part of the connection portion is disposed on the penetrating portion and connected to the penetrating portion.

4. The battery cell according to claim 3, wherein the penetrating portion is annular, and a radial width by which the connection portions covers the terminal-post body is less than a radial wall thickness of the penetrating portion.

5. The battery cell according to claim 3, wherein the abutting portion is connected to the penetrating portion and extends relative to the penetrating portion in a direction away from the central axis of the mounting hole, and the abutting portion protrudes from the penetrating portion in a direction away from the accommodating cavity, to define the sink groove between a surface of the abutting portion close to the central axis of the mounting hole and a surface of the penetrating portion away from the accommodating cavity.

6. The battery cell according to claim 5, wherein a depth of the sink groove in an axial direction of the mounting hole ranges from one third to two thirds of a thickness of the abutting portion in the axial direction of the mounting hole.

7. The battery cell according to claim 3, wherein the penetrating portion is annular, and a side of the sink groove close to the central axis of the mounting hole is open, to communicate with an inner annular region of the penetrating portion.

8. The battery cell according to claim 3, wherein the abutting portion comprises a first section and a second section that are sequentially disposed in a direction away from the penetrating portion, and when a surface perpendicular to an axial direction of the mounting hole is used as a projection surface and the axial direction of the mounting hole is used as a projection direction, a projection of the first section on the projection surface is located inside a projection of the mounting hole on the projection surface, and a projection of the second section on the projection surface is located outside the projection of the mounting hole on the projection surface, the first section defines a side groove wall of the sink groove, at least a part of the first section is disposed between the second section and the sink groove and is not configured to abut against the housing.

9. The battery cell according to claim 1, wherein the abutting portion is formed on the terminal-post body through flange riveting.

10. The battery cell according to claim 1, wherein a distance between the connection portion and the groove wall of the sink groove close to the abutting portion gradually increases in a direction away from the accommodating cavity.

11. The battery cell according to claim 1, wherein a cross-sectional area of the sink groove gradually increases in the direction away from the accommodating cavity.

12. The battery cell according to claim 1, wherein the terminal-post cover plate comprises a cover plate body, the connection portion is located at an edge of the cover plate body, and a surface of a side of the cover plate body away from the accommodating cavity protrudes from a surface of a side of the connection portion away from the accommodating cavity.

13. The battery cell according to claim 1, wherein a thickness of the abutting portion in an axial direction of the mounting hole is greater than a thickness of the connection portion in the axial direction of the mounting hole.

14. The battery cell according to claim 1, wherein a thickness of the connection portion in an axial direction of the mounting hole ranges from three quarters to five quarters of a depth of the sink groove in the axial direction of the mounting hole.

15. The battery cell according to claim 1, wherein a surface of the connection portion away from the accommodating cavity obliquely extends toward a direction approaching the accommodating cavity and in the direction away from the central axis of the mounting hole.

16. The battery cell according to claim 1, wherein the terminal-post body comprises a penetrating portion penetrating through one of the mounting hole, and the abutting portion is connected to the penetrating portion and extends relative to the penetrating portion in the direction away from the central axis of the mounting hole; and the battery cell further comprises an insulating and sealing structure configured to enable the housing and the terminal-post body to fit in an insulating and sealing manner, and the insulating and sealing structure comprises a part disposed between the penetrating portion and the housing and a part disposed between the abutting portion and the housing, wherein a first corner disposed toward the housing is provided at a position at which the abutting portion is connected to the penetrating portion, a corner of the housing that is disposed close to the first corner is a second corner, the insulating and sealing structure comprises a third corner disposed corresponding to the first corner and a fourth corner disposed corresponding to the second corner, and at least one of the first corner, the second corner, the third corner, and the fourth corner is formed as a chamfer;

a fitting gap is provided between the first corner and the third corner, a fitting gap is provided between the second corner and the fourth corner.

17. The battery cell according to claim 1, wherein an accommodating groove open in the direction away from the accommodating cavity is formed on the terminal-post body, the sink groove is disposed around the accommodating groove and communicates with the accommodating groove, the terminal-post body is provided with a communicating hole, the communicating hole penetrates through a groove wall of the accommodating groove that is close to the accommodating cavity and communicates the accommodating cavity with the accommodating groove, the battery cell comprises a cell assembly, the cell assembly comprises an active-material coating portion accommodated in the accommodating cavity and a conductive portion connected to the active-material coating portion, and the conductive portion penetrates through the communicating hole to be at least partially accommodated in the accommodating groove, wherein a liquid injection hole capable of communicating with the accommodating groove is formed on the terminal-post cover plate, the battery cell further comprises a sealing structure configured to seal the liquid injection hole.

18. A battery cell, comprising:

a housing, provided with a mounting hole, wherein an accommodating cavity is defined in the housing;

a terminal-post body, wherein the terminal-post body comprises a penetrating portion and an abutting portion, the penetrating portion penetrates through the mounting hole, the abutting portion abuts outside the housing, the abutting portion is connected to the penetrating portion and extends relative to the penetrating portion in a direction away from a central axis of the mounting hole, and a sink groove open in a direction away from the accommodating cavity is formed between the abutting portion and the penetrating portion, the sink groove is hollowed in a direction toward the accommodating cavity and is open in the direction away from the accommodating cavity, a notch of the sink groove is located on a surface of the terminal-post body on a side away from the accommodating cavity; and a terminal-post cover plate, covering the terminal-post body, wherein an edge of the terminal-post cover plate is disposed in the sink groove, and welded to the penetrating portion in a penetrating manner, and a welding structure formed through the welding is separated from the abutting portion, a separation space S is provided between the edge of the terminal-post cover plate and a side groove wall of the sink groove, the side groove wall is a surface of the sink groove close to the abutting portion, a distance between the welding structure and the abutting portion gradually increases in the direction away from the accommodating cavity.

19. A battery cell, comprising:

a housing, provided with mounting hole, wherein an accommodating cavity is defined in the housing;

a terminal-post body, wherein the terminal-post body penetrates through the mounting hole, the terminal-post body comprises an abutting portion abutting outside the housing, a sink groove is provided at an end portion of the terminal-post body away from the accommodating cavity, the sink groove is hollowed in a direction toward the accommodating cavity and is open in a direction away from the accommodating cavity, a notch of the sink groove is located on a surface of the terminal-post body on a side away from the accommodating cavity, and the sink groove is disposed closer to a central axis of the mounting hole than the abutting portion; and a terminal-post cover plate, covering the terminal-post body and comprising a connection portion connected to a part of the terminal-post body at the sink groove, wherein when a surface perpendicular to an axial direction of the mounting hole is used as a projection surface and the axial direction of the mounting hole is used as a projection direction, a projection of a part of the abutting portion that abuts against the housing on the projection surface is separated from a projection of one of the connection portions on the projection surface, wherein the terminal-post body comprises a penetrating portion penetrating through the mounting hole, and the abutting portion is connected to the penetrating portion and extends relative to the penetrating portion in a direction away from the central axis of the mounting hole; a separation space S is provided between the connection portion and a side groove wall of the sink groove, the side groove wall is a surface of the sink groove close to the abutting portion, a part of a projection of the abutting portion on the projection surface is located within a projection range of the mounting hole on the projection surface, the projection of the connection portion on the projection surface is located within a projection range of the penetrating portion on the projection surface, and the connection portion is disposed on the penetrating portion and connected to the penetrating portion.

20. The battery cell according to claim 16, wherein the first corner disposed toward the housing is provided at a position at which the abutting portion is connected to the penetrating portion, the corner of the housing that is disposed close to the first corner is the second corner, the insulating and sealing structure comprises a first part and a second part, a material hardness of the first part is less than a material hardness of the second part, and the first part is disposed closer to at least one of the first corner and the second corner than the second part, the first part comprises a first sub part, the first sub part is disposed closer to the first corner than the second part, the first sub part defines a part of a surface that is of the insulating and sealing structure and that is on a side facing the abutting portion, the first sub part defines a part of a surface that is of the insulating and sealing structure and that is on a side facing the penetrating portion, the abutting portion and an end portion of the penetrating portion that is connected to the abutting portion form a first terminal-post portion, the insulating and sealing structure comprises a first insulating and sealing member fitted between the first terminal-post portion and the housing, and a pad configured to buffer a force applied to the first insulating and sealing member by the first terminal-post portion and/or the housing is disposed between the first terminal-post portion and the housing, the pad comprises at least one of a first pad, a second pad, and a third pad, the first pad is disposed between the abutting portion and the first insulating and sealing member, the second pad is disposed between the penetrating portion and the first insulating and sealing member, the third pad is disposed between the first insulating and sealing member and an outer surface of the housing, and a material hardness of the third pad is less than a material hardness of the first insulating and sealing member.

* * * * *